United States Patent Office 3,466,845
Patented Sept. 16, 1969

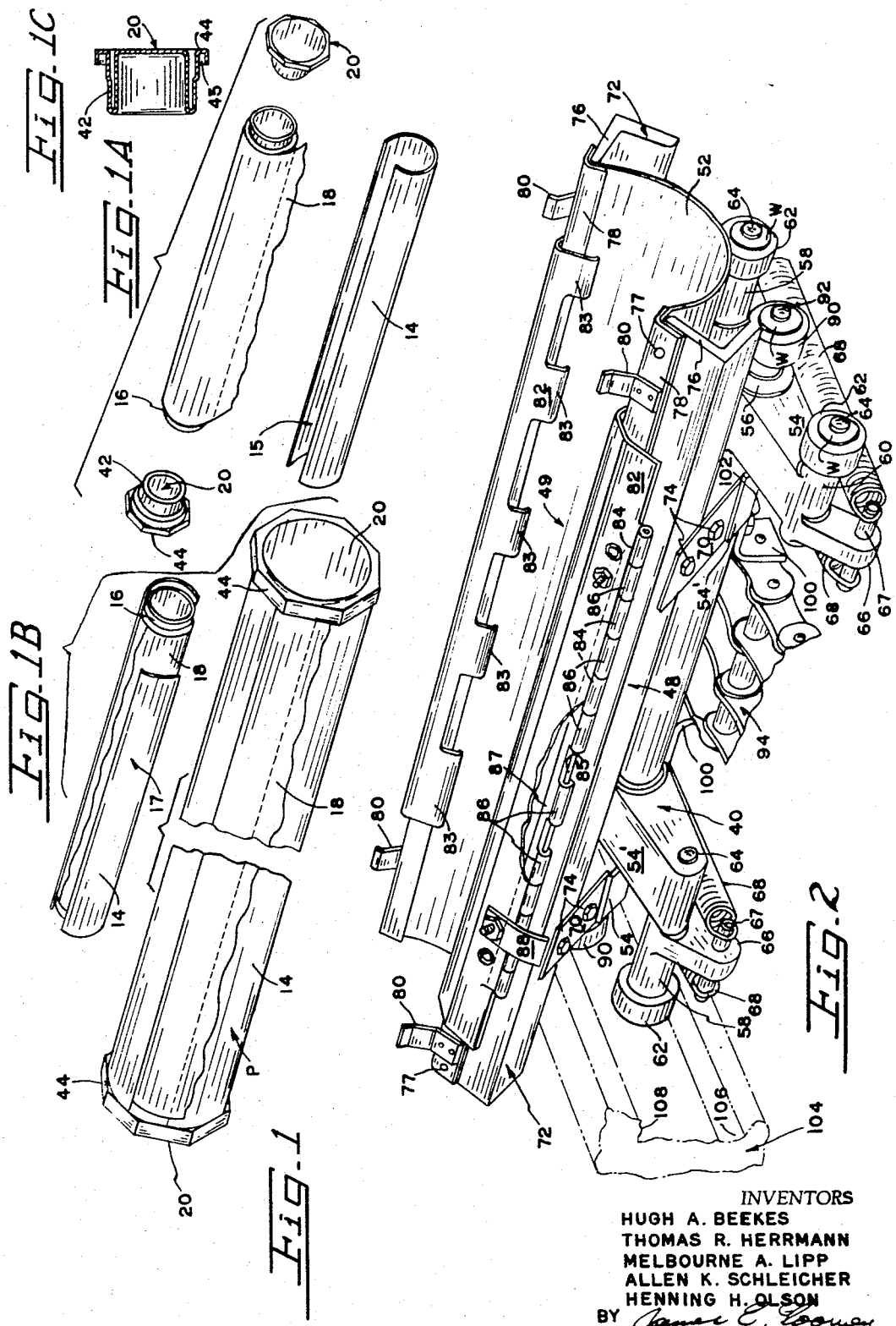

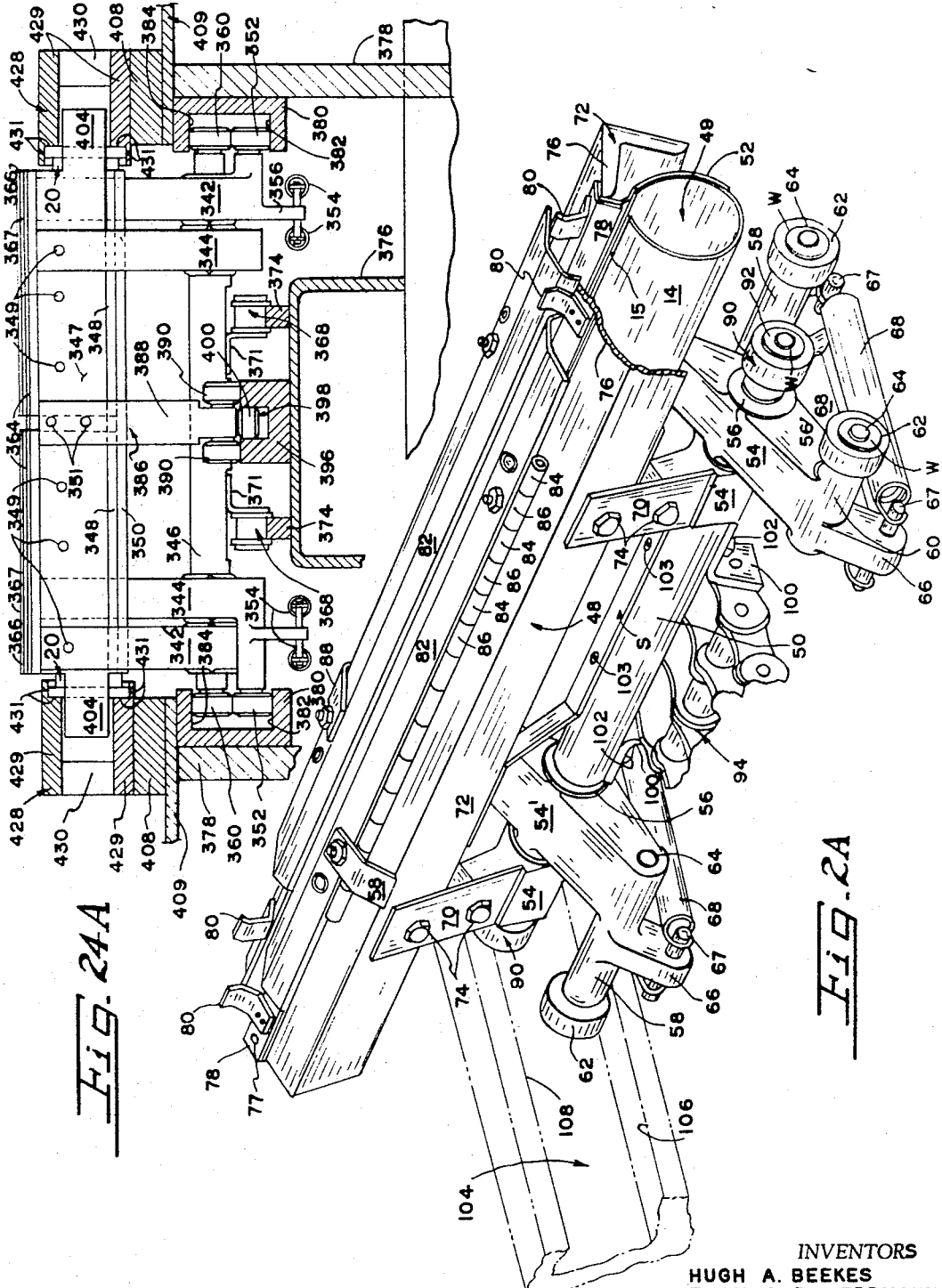

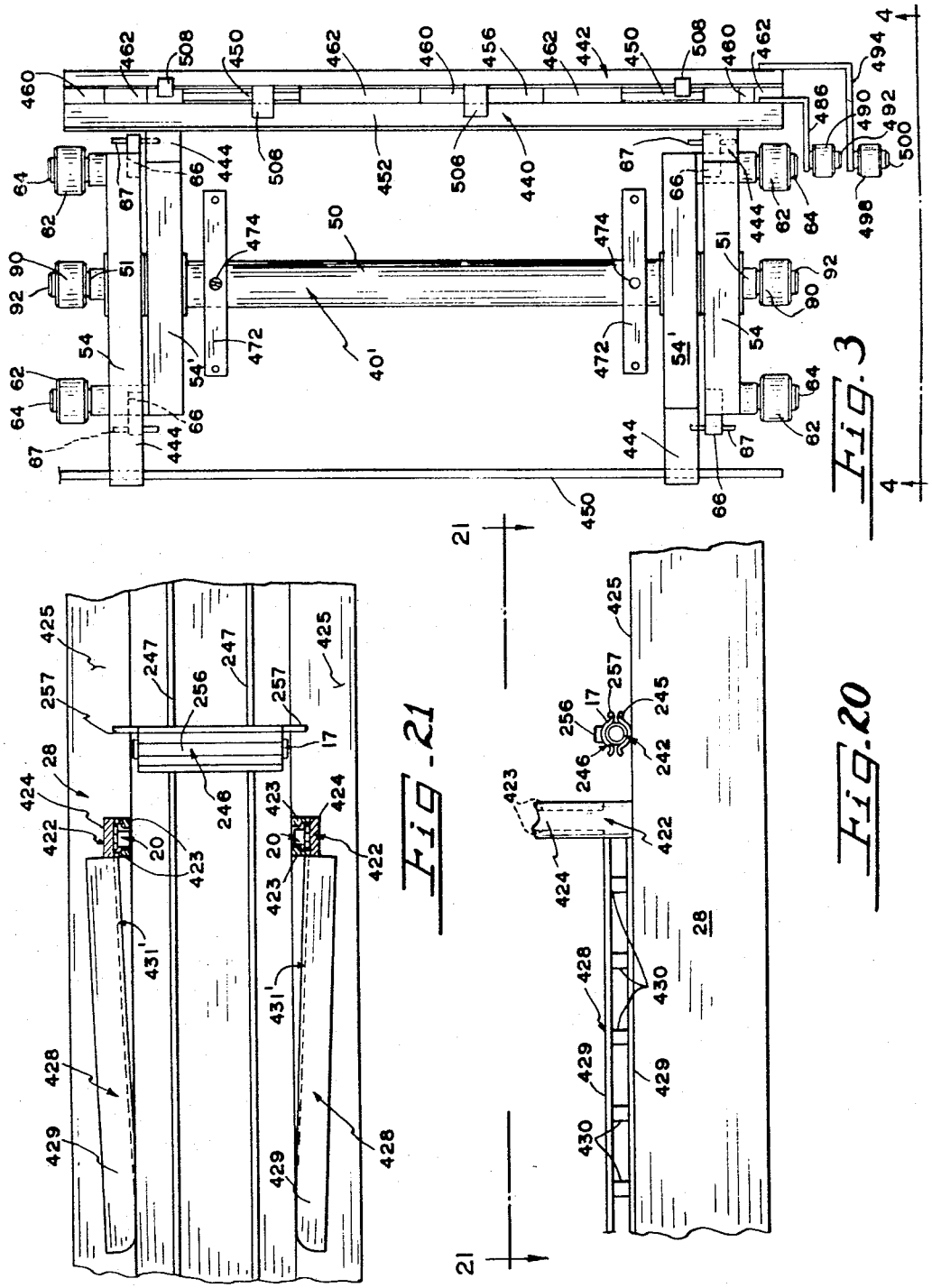

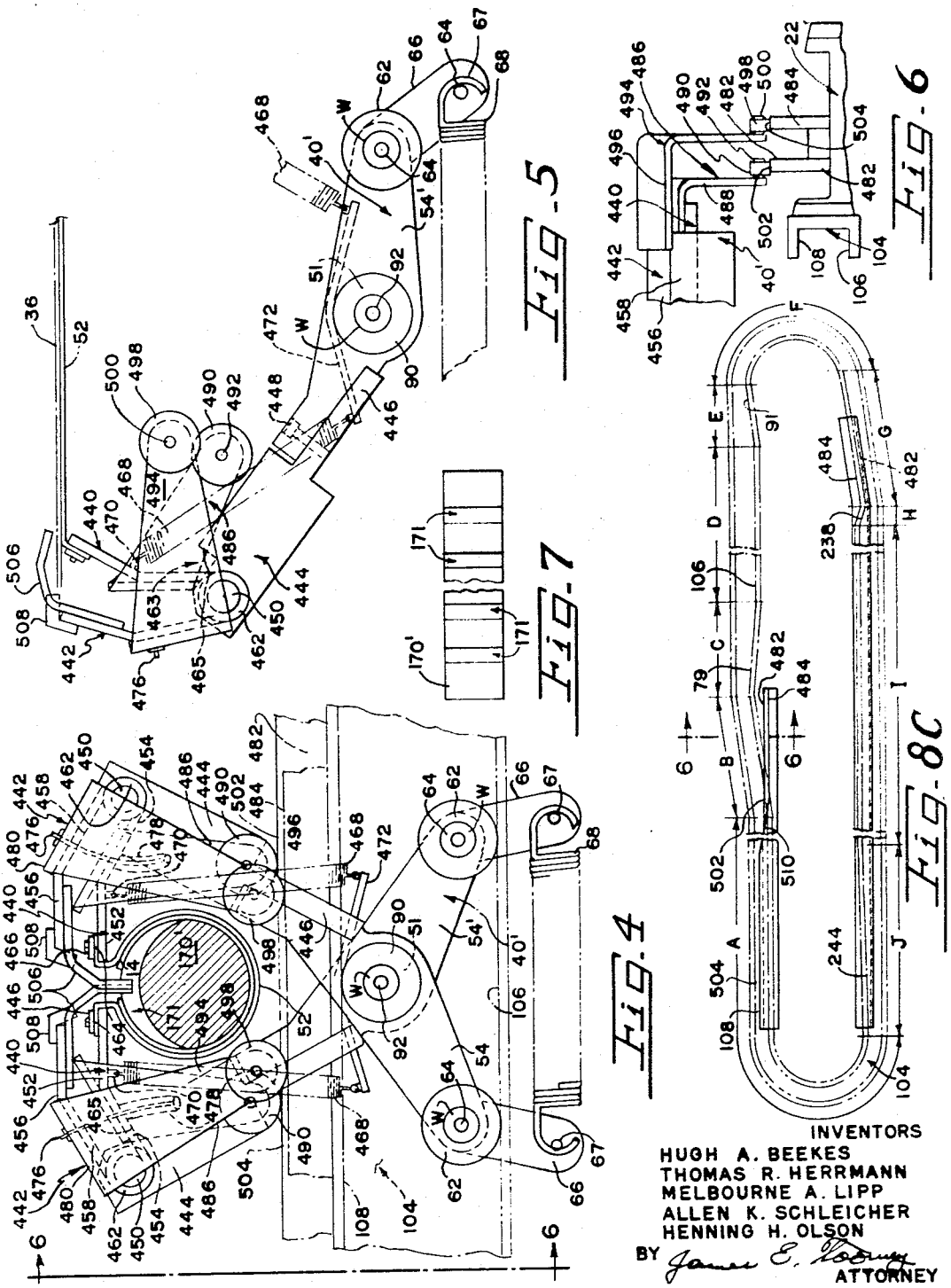

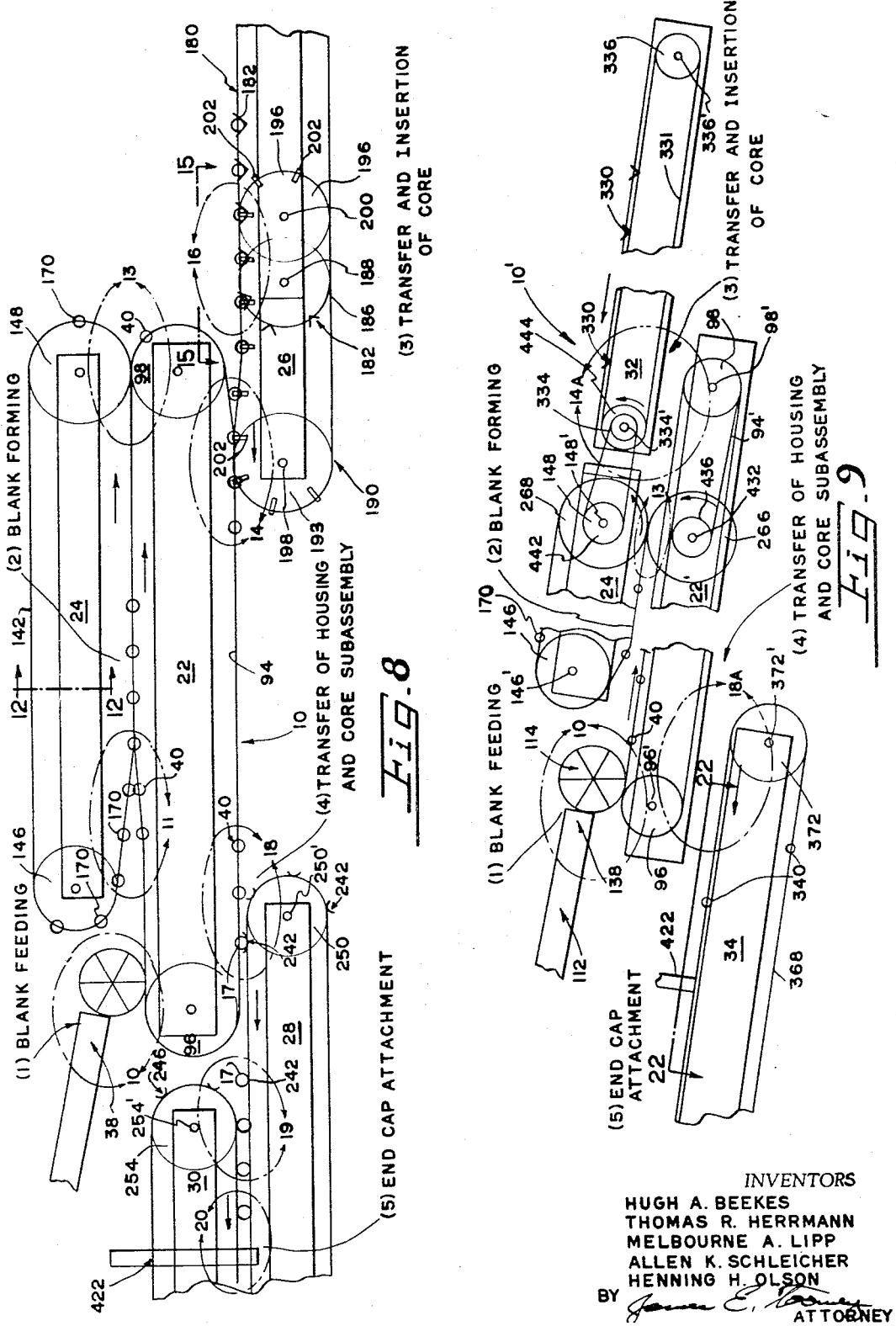

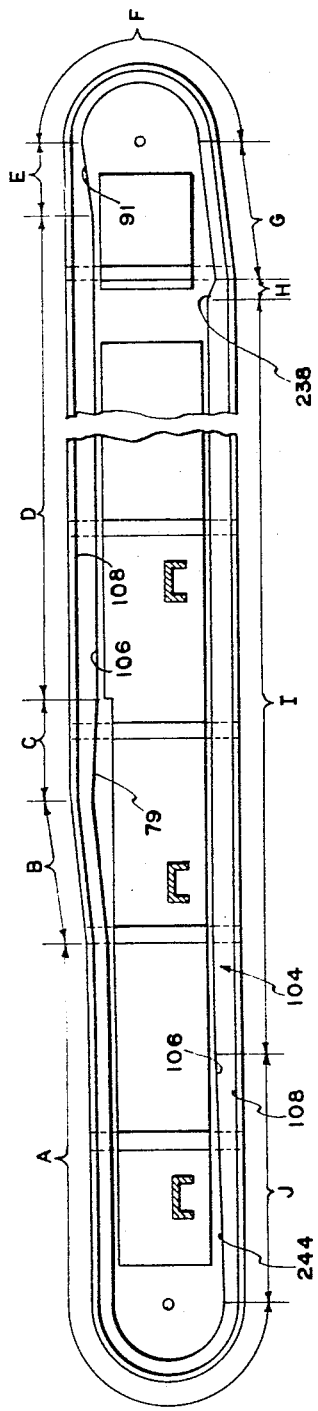
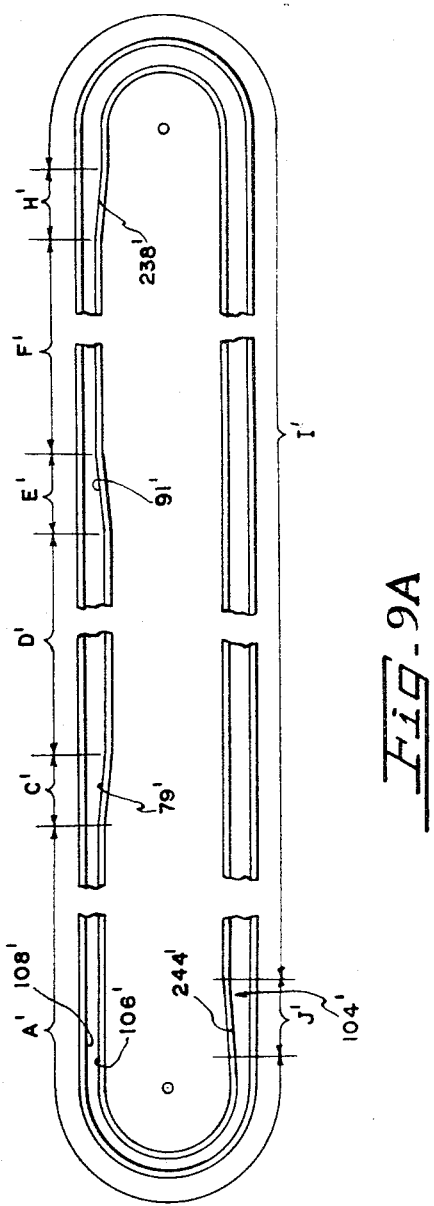

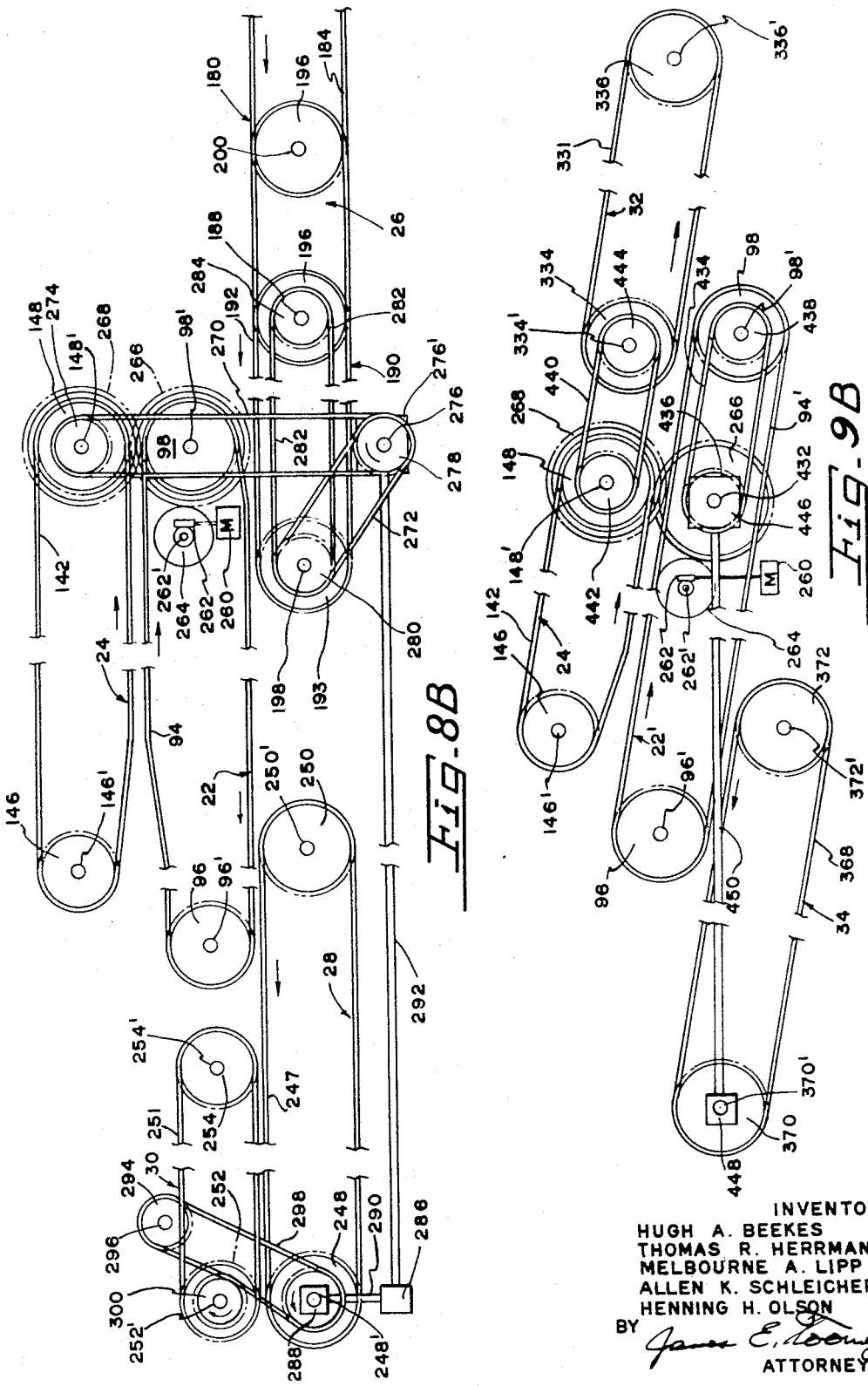

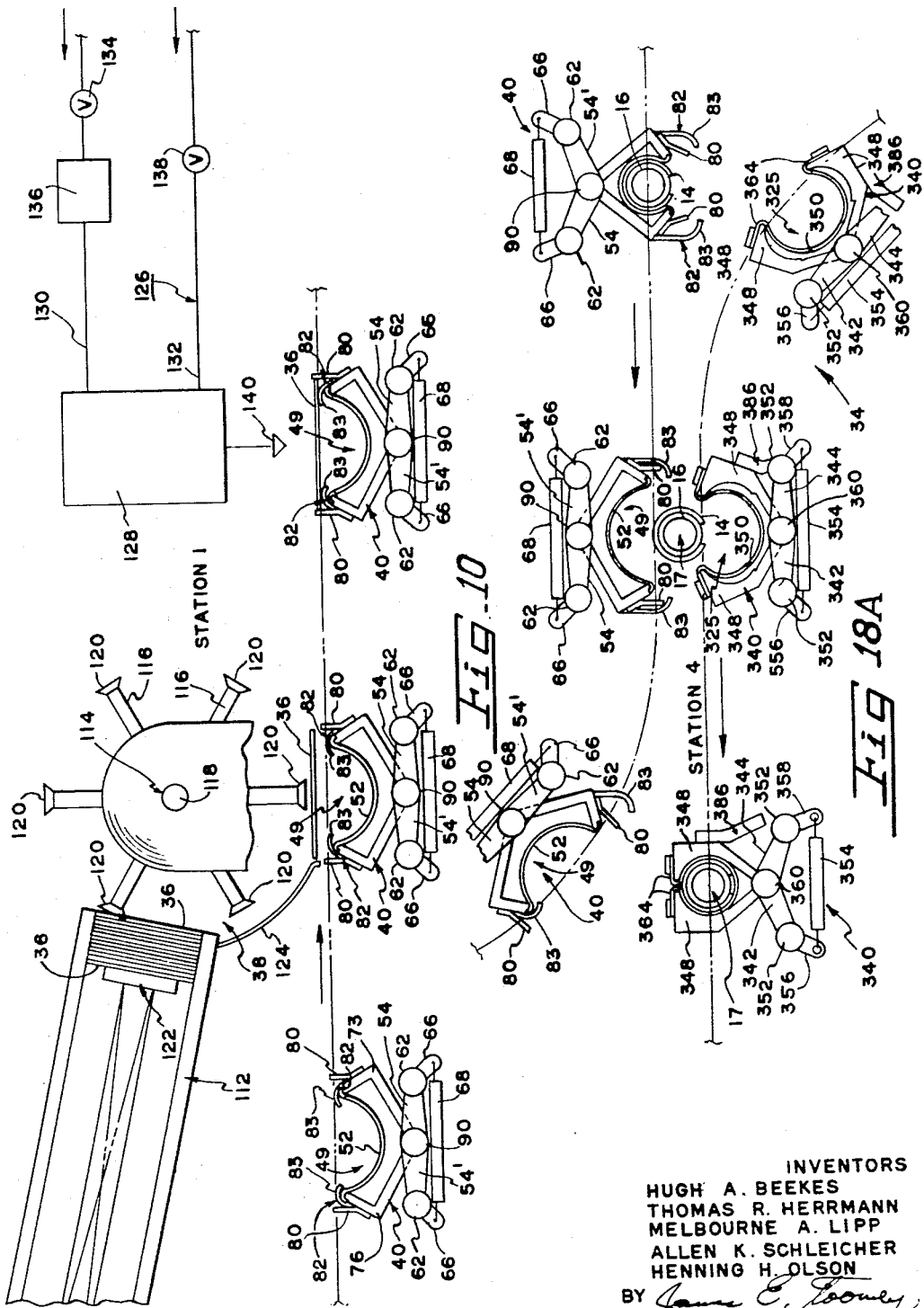

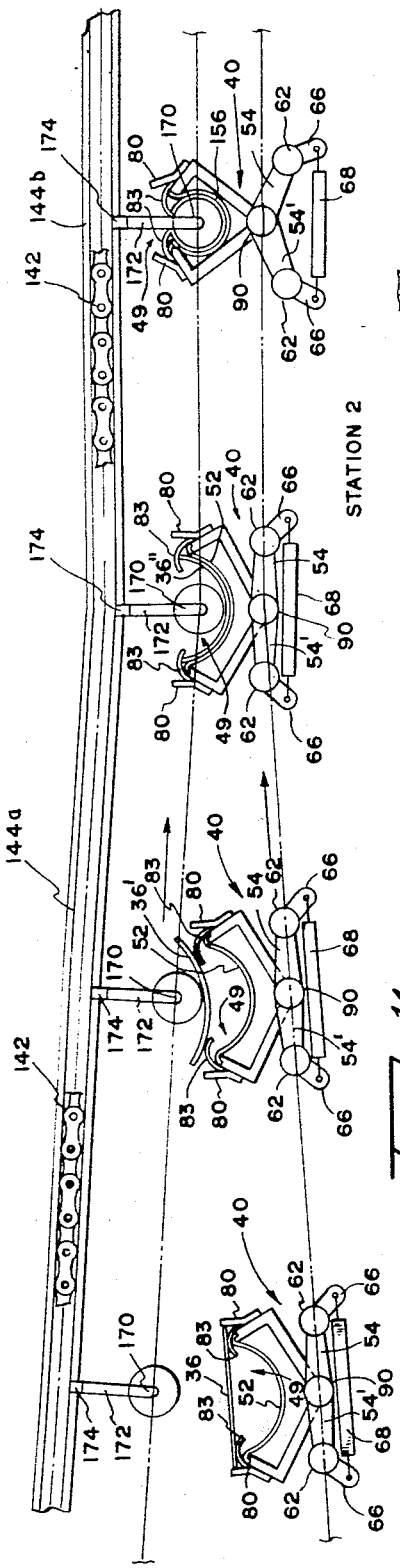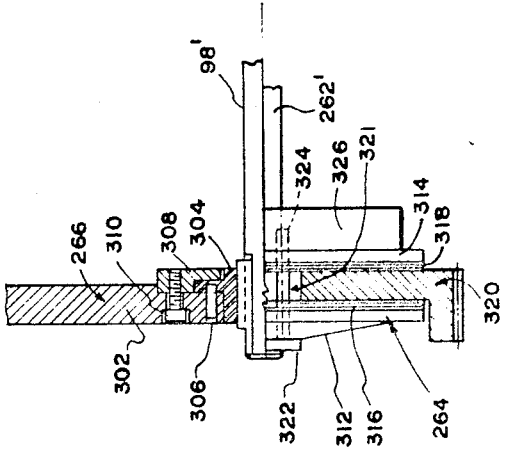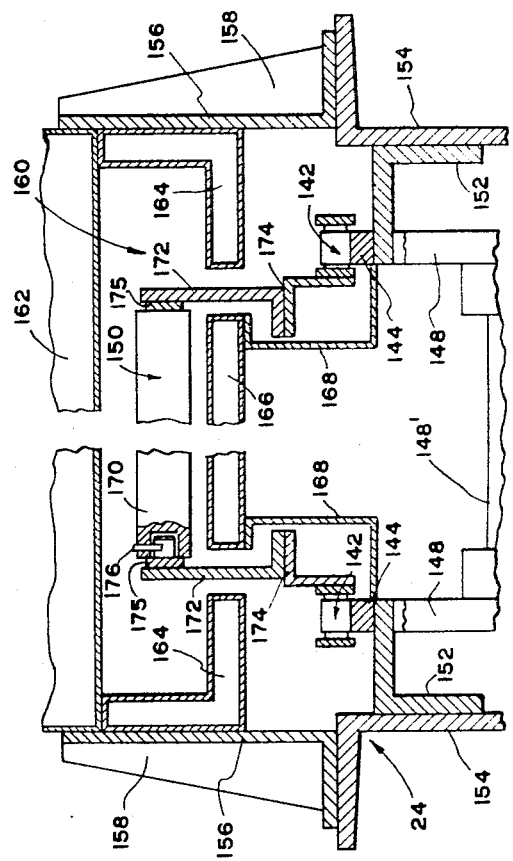

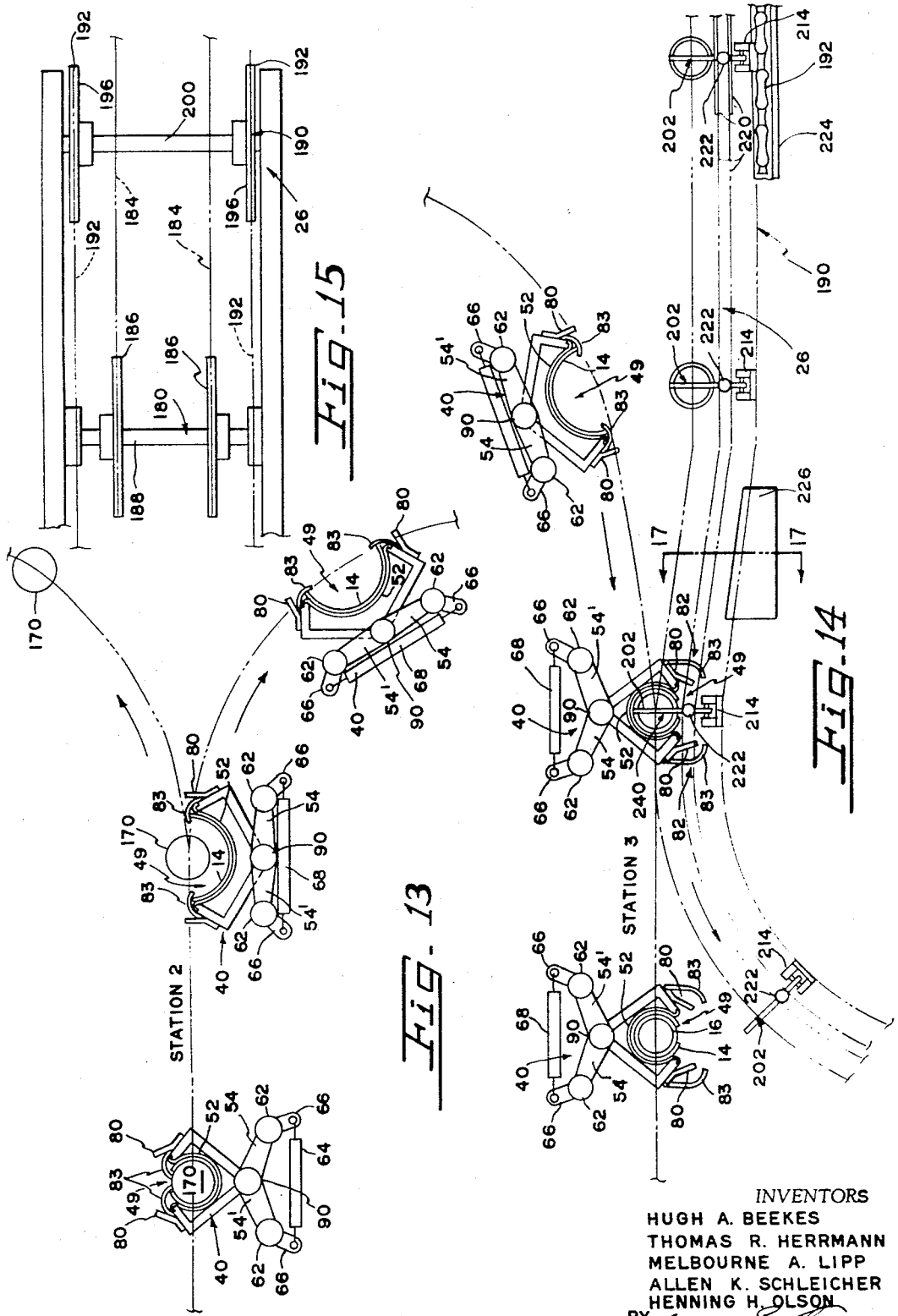

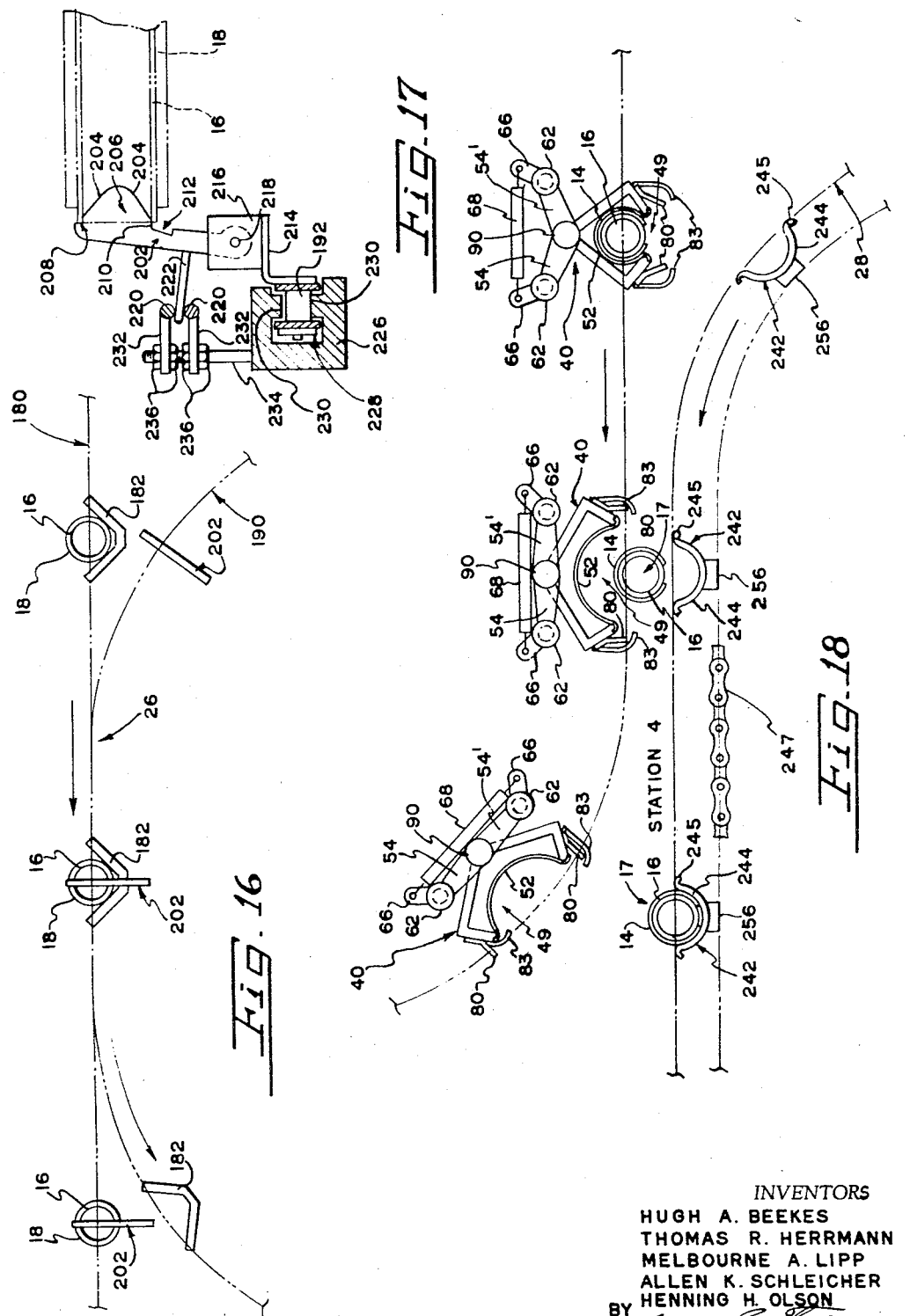

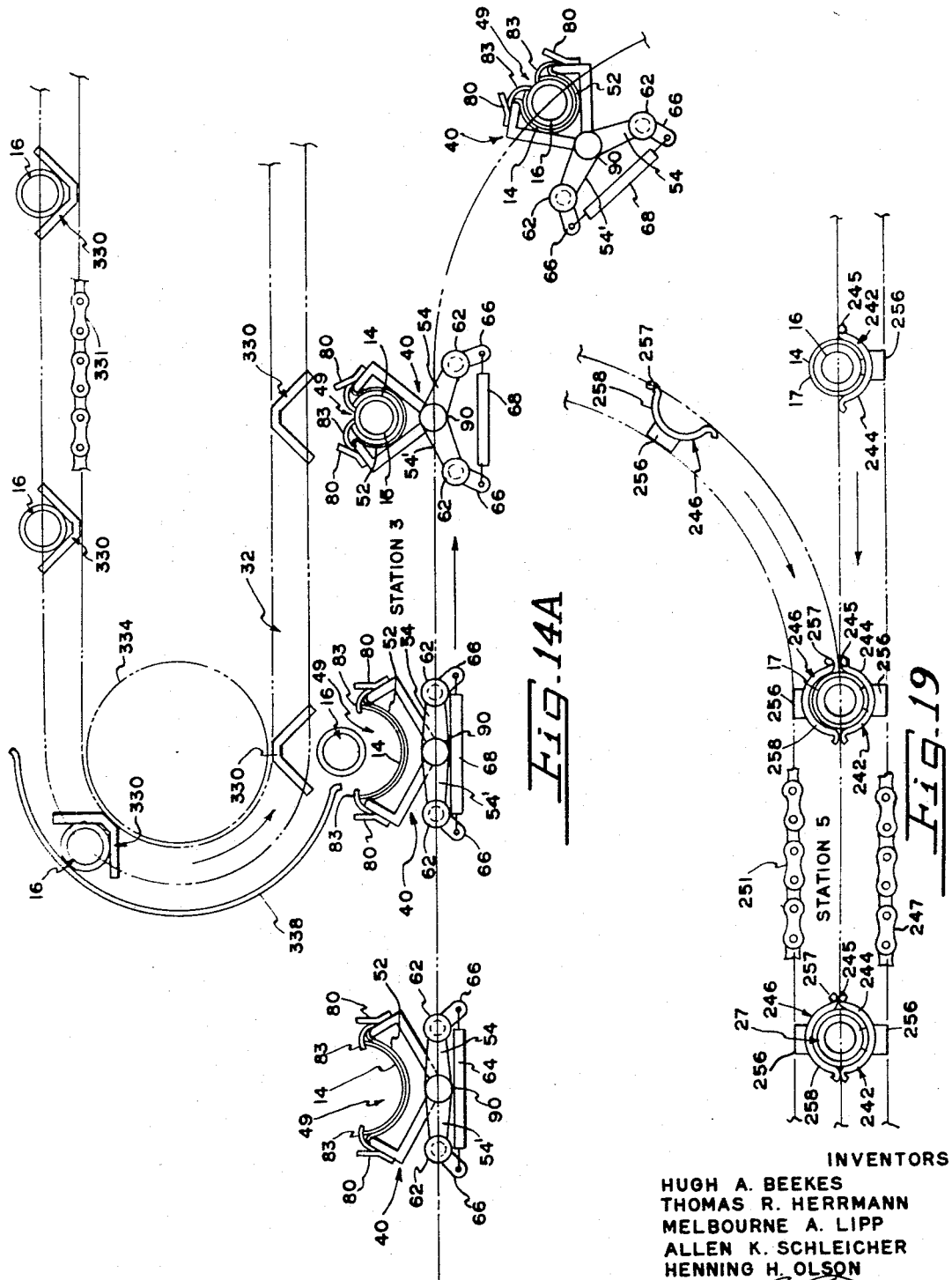

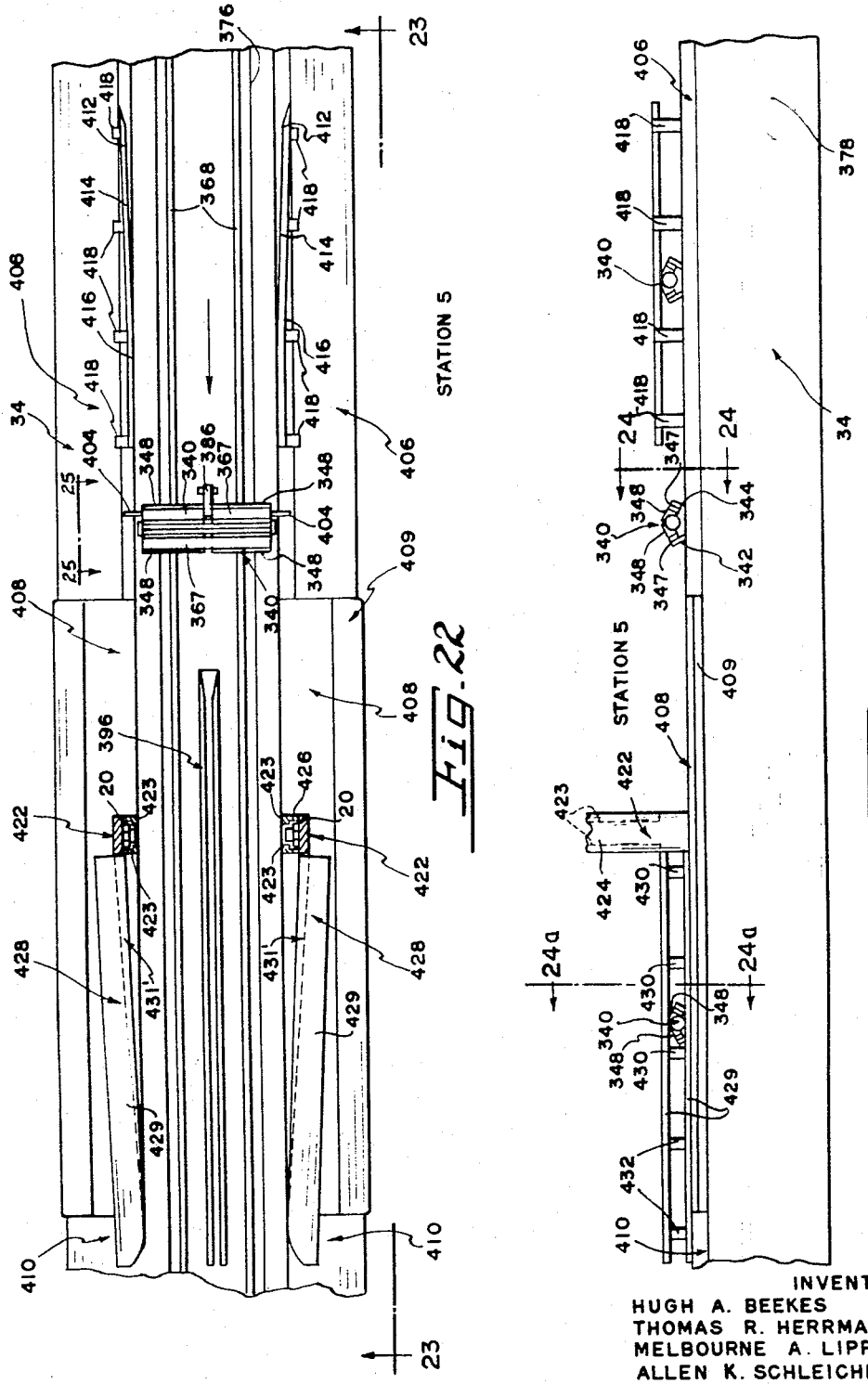

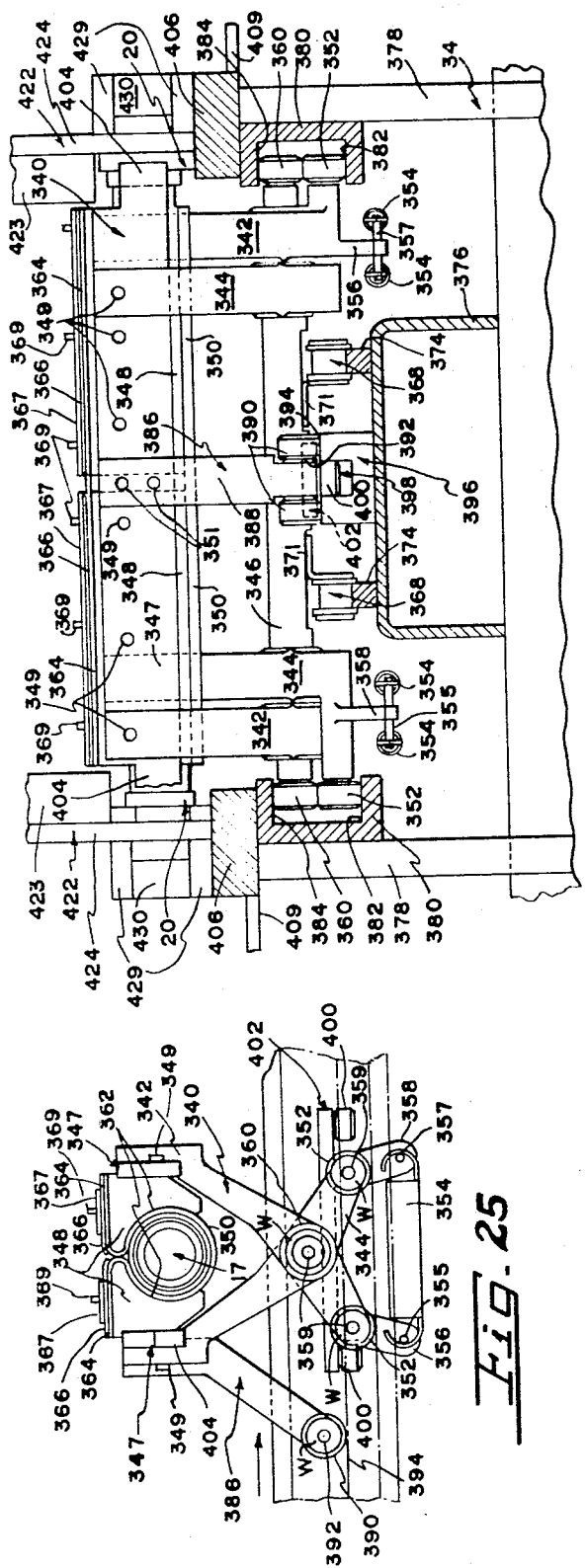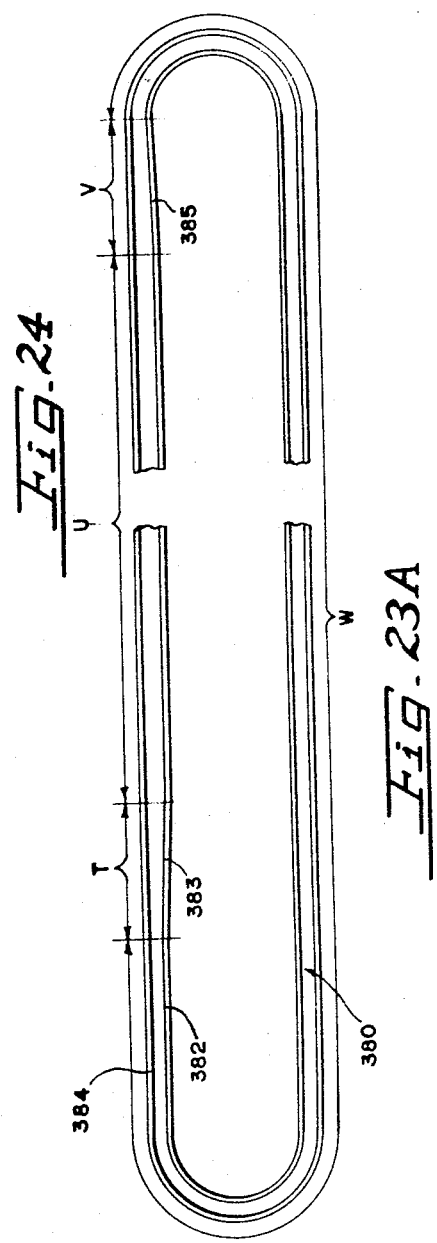

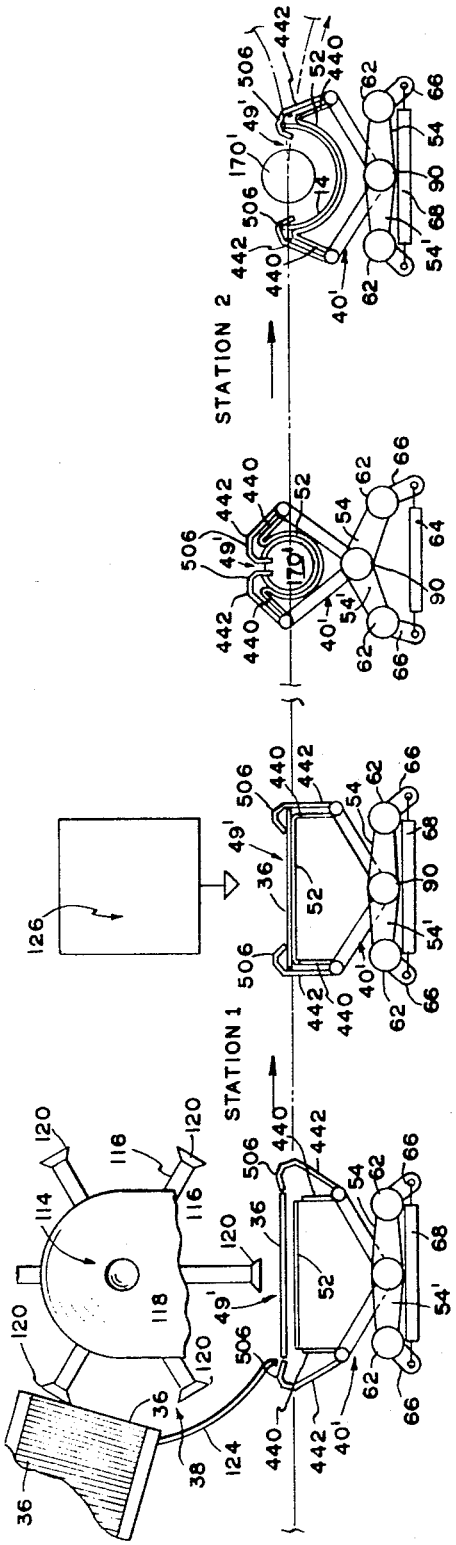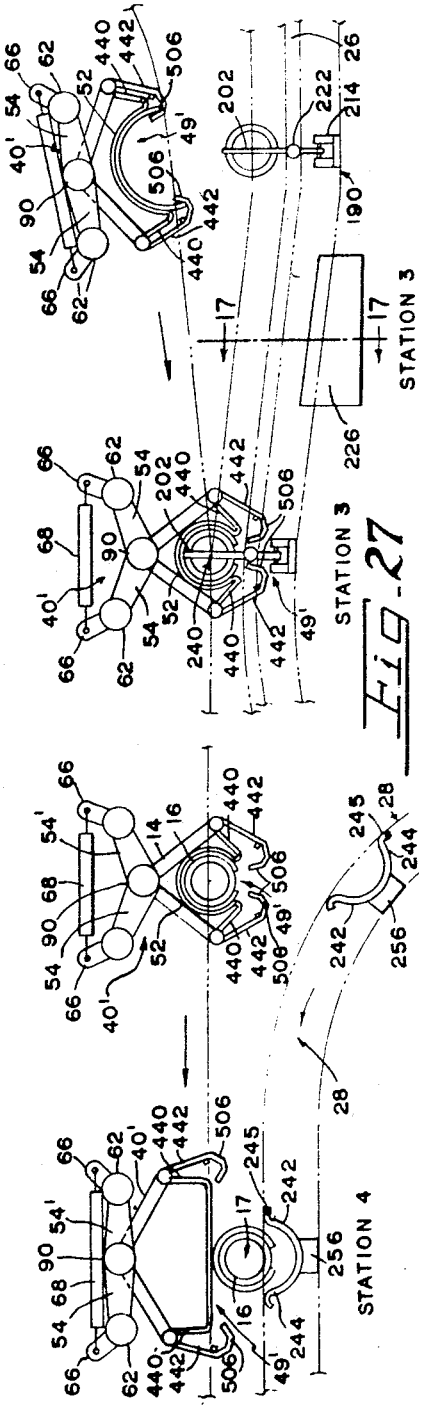

3,466,845
MULTISTATION PACKAGING APPARATUS AND SYSTEM FOR FORMING A MULTICOMPONENT PACKAGE
Hugh A. Beekes, Saratoga, Thomas R. Herrmann, Pacific Grove, Melbourne A. Lipp, Pebble Beach, Henning H. Olson, Carmel-by-the-Sea, and Allen K. Schleicher, Berkeley, Calif., assignors, by direct and mesne assignments, to Kaiser Aluminum & Chemical Corporation, Oakland, Calif., a corporation of Delaware
Filed Feb. 18, 1966, Ser. No. 528,476
Int. Cl. B65b 5/02, 43/08; B31c 3/02
U.S. Cl. 53—194                        39 Claims

ABSTRACT OF THE DISCLOSURE

An improved multistation packaging apparatus and system for forming a multicomponent package, wherein the packaging apparatus and system includes an improved carrier means movable in an improved fashion between and past a series of work performing stations and wherein the carrier means has improved pocket and mandrel means and finger elements for receiving and selectively bending a foldable blank whereby the blank can be formed into a dispensing container, merchanise inserted into the container and, if desired end closures applied thereto.

This invention relates to a packaging apparatus and system involving a plurality of different stations for continuously forming and assembling a plurality of components into a merchandising and dispensing package. More particularly, it relates to an improved packaging apparatus and system provided with a plurality of systematized and correlated endless conveyers and related apparatus constructed and arranged in an improved fashion so as to facilitate the continuous and automatic forming and assembling of a plurality of package components and wherein one of the component pieces of the package is formed at one of the stations and then assembled with other preformed component pieces of the package at other stations so as to produce the finally desired package such as a package of the type shown in U.S. Patent No. 3,228,579, granted Jan. 11, 1966, for merchandising and dispensing aluminum foil.

Accordingly, it is the primary purpose of the instant invention to provide an improved packaging apparatus and system having a plurality of appropriately located and arranged stations and correlated conveyors for continuously assembling components of a package together while at the same time forming one of the components to be used in the assemblage.

This and other purposes and advantages of the instant invention will become more apparent from a review of the following detailed description when taken in conjunction with the appended drawings; wherein:

FIG. 1 is a perspective view, an intermediate portion of which has been broken away, of a three-piece merchandising and dispensing package produced by the packaging apparatus and system of the instant invention;

FIG. 1A is a generally exploded perspective view of the various pieces used in making up the package of FIG. 1 prior to their assembly by the packaging apparatus and system of the instant invention and with one of the parts or pieces being additionally shown in section;

FIG. 1B is another perspective view, portions of which have been broken away, of two of the principal components of the package;

FIG. 1C is an enlarged cross sectional view of one of the end cap pieces shown in FIG. 1A;

FIG. 2 is an enlarged fragmentary perspective view of a significant carrier element of a forming and assembling conveyor used in the apparatus and system of the instant invention, parts of which are shown in dotted lines and with one of the carriers of the conveyor being in an open position;

FIG. 2A is a view similar to FIG. 2 and discloses the carrier in a closed position;

FIG. 3 is a plan view of a modified carrier shown in FIG. 4 for performing combined forming and assembling operations and illustrates the carrier in an open position wherein certain parts are removed and other parts are shown in solid and dotted lines;

FIG. 4 is a partial end view generally taken along line 4—4 of FIG. 3 wherein parts have been added, other parts removed and other parts shown in cross-section or dotted lines;

FIG. 5 is a partial end view of the modified carrier of FIGS. 3 and 4 in an open position and with a portion of a flat blank to be formed being deposited on a blanket element of the carrier;

FIG. 6 is a reduced broken view with parts removed for the sake of clarity and generally taken along line 6—6 of FIG. 4 and illustrates further details of the carrier of FIGS. 3 and 4;

FIG. 7 is a reduced plan view of the mandrel for the carrier of FIGS. 3 and 4, an intermediate portion of which has been broken away;

FIG. 8 is a diagrammatic view of the overall arrangement of the packaging apparatus and system of the instant invention and illustrates the general location of five different stations and correlated endless conveyors used in first forming one of the pieces of the packaging and then completely assembling the aforesaid formed and other preformed pieces of the package together;

FIG. 8A is an elevational view, portions of which have been broken away of the cam track associated with the forming and assembling conveyor of the apparatus of FIG. 8;

FIG. 8B is a diagrammatic view of a suitable drive arrangement for synchronously operating the conveyors of the apparatus shown in FIG. 8 in timed relation to each other;

FIG. 8C is an elevational view of the cam track for the modified carrier of FIGS. 3–6 wherein various parts have been shown in both dotted and solid lines;

FIG. 9 is a diagrammatic view of the overall arrangement of a modified form of the packaging apparatus and system shown in FIG. 8;

FIG. 9A is an elevational view, portions of which have been broken away, of the cam track associated with the forming and assembling conveyor of the modified packaging apparatus of FIG. 9;

FIG. 9B is a diagrammatic view of a suitable drive mechanism for synchronously operating in timed relation the conveyors of the apparatus of FIG. 9;

FIG. 9C is a cross-sectional view of certain gearing elements that can be used with the drive mechanism of FIGS. 8B or 9B;

FIG. 10 is an enlarged diagrammatic view taken within circumscribing line 10 of FIGS. 8 or 9 and illustrates further details of the first station for feeding the flat blank onto the associated carrier of the forming assembling conveyor of the apparatus during passage of the aforesaid carrier through the blank feeding station;

FIG. 11 is an enlarged diagrammatic view taken within the bounds of encircling line 11 of FIG. 8 and illustrates details at the entrance of the second station for forming the blank into a tube-like housing upon the convergence and parallel disposition of the paths of travel of the flights of the mandrel conveyor and the forming and assembling conveyor for forcibly and progressively inserting the mandrel and the fed blank into the associated carrier of the forming and assembling conveyor.

FIG. 12 is an enlarged cross-sectional view taken generally along line 12—12 of FIG. 8 and illustrates details of the heating device disposed in operative relation to the upper flight of the mandrel conveyor;

FIG. 13 is an enlarged diagrammatic view taken within the bounds of encircling line 13 of FIGS. 8 or 9 and illustrates further details of the exit portion of a second station for releasing the mandrel from the formed blank within the associated carrier of the forming and assembling conveyor;

FIG. 14 is an enlarged diagrammatic view within the limits of circumscribing line 14 of FIG. 8 and illustrates details of a third station between the core conveyor and the forming and assembling conveyor for effecting transfer and insertion of the core into the formed blank disposed within the associated carrier of the forming and assembling conveyor;

FIG. 14A is an enlarged diagrammatic view taken within the encompassment of encircling line 14A of FIG. 9 and illustrates details of the carried and core conveyors of the modified packaging apparatus at the station for carrying effecting transfer and insertion of the core piece into the formed blank disposed within the associated carrier of the forming and assembling conveyor;

FIG. 15 is an enlarged plan view generally taken along line 15—15 of FIG. 8, portions of which have been broken away and other parts shown in dotted and solid lines and illustrates details of the relative disposition of two tandem conveyors making up the core conveyor;

FIG. 16 is an enlarged diagrammatic view taken within the bounds of circumscribing line 16 of FIG. 8 and illustrates further details of two tandem core conveyors of the packaging apparatus of FIG. 8;

FIG. 17 is an enlarged partial cross-sectional view taken along line 17—17 of FIG. 14 wherein certain parts are removed and other parts are shown in dotted and solid lines and illustrates further details of one of the tandem conveyors for carrying a core and for effecting transfer and insertion of the core into the formable housing part of the package;

FIG. 18 is a diagrammatic view taken within the bounds of circumscribing line 18 of FIG. 8 and illustrates a fourth station for effecting transfer of the sub-assembly of the package made up of the housing or sleeve and core pieces from the forming and assembling conveyor to another conveyor of the apparatus;

FIG. 18A is a diagrammatic view taken within the encircling boundary line 18A of the modified packaging apparatus of FIG. 9 and illustrates the fourth station for effecting transfer of the sub-assembly of the core and housing pieces from the forming and assembling conveyor to another conveyor;

FIG. 19 is an enlarged diagrammatic view taken within the encircling line 19 of FIG. 8 and illustrates the specific alignment of the carriers of the superimposed conveyors with one another during a portion of the travel of the conveyors and prior to attachment of the end caps to the package housing and core at a fifth station;

FIG. 20 is a diagrammatic view on an enlarged scale within the limits of circumscribing line 20 of FIG. 8 and illustrates details of the fifth station for effecting attachment of the end caps of the package to the core and housing pieces thereof;

FIG. 21 is a plan view taken generally along line 21—21 of FIG. 20 and illustrates further details of the fifth station of the apparatus and system;

FIG. 22 is a partial plan view of one of the conveyors as viewed along line 22—22 of the modified apparatus of FIG. 9 and illustrates details of the fifth station for effecting attachment of the end caps to the housing and core;

FIG. 23 is a partial front elevational view taken generally along line 23—23 of FIG. 22 and illustrates further details of the fifth station;

FIG. 23A is a broken elevational view of a cam track associated with the conveyor at the fifth station of the packaging apparatus and system of FIG. 9;

FIG. 24 is an enlarged partial sectional view taken along line 24—24 of FIG. 23 and illustrates further details of the conveyor and its carrier for transporting the sub-assembly of the package at the fifth station prior to attachment of the final end caps;

FIG. 24A is another enlarged partial sectional view taken along line 24A—24A of FIG. 23 and illustrates further details of the conveyor and the sub-assembly carrier thereof at the fifth station during attachment of the end caps;

FIG. 25 is a partial side elevational view on an enlarged scale, taken generally along line 25—25 of FIG. 22 wherein certain parts have been removed and other parts shown in dotted lines and illustrates further details of the conveyor and its carrier in a closed position wherein the carrier surrounds and firmly grasps the sub-assembly of the package;

FIG. 26 is an enlarged diagrammatic view wherein certain parts have been added and other parts removed or broken away and illustrates details of the first and second stations of the packaging apparatus and system of FIG. 8 but with the forming and assembling conveyor incorporating the modified carrier of FIGS. 3–6; and FIG. 27 is an enlarged diagrammatic view in which parts have been added and other parts broken away or removed and illustrates details of the forming and assembling conveyor with the modified carrier of FIGS. 3–6 when the carrier passes through the third and fourth stations.

With further reference to the drawings, a preferred form of system and packaging apparatus that can be used in carrying out the teachings of the instant invention generally comprises an apparatus 10 provided with a number of different operative stations such as the stations 1–5 of FIG. 8 uniquely located along and interconnected by a plurality of correlated and systematized endless conveyors, namely; a forming and assembling conveyor 22, a mandrel conveyor 24, a core conveyor 26 and cooperative end cap attachment conveyors 28 and 30.

A preferred form of package P that can be produced by the system and apparatus of the instant invention and best shown in FIGS. 1–1B generally comprises an opened end tubular housing 14 having an elongated slot 15 defined between the slightly spaced longitudinal edges of the housing. The housing surrounds a core 16 about which is tightly wound a given length of web or web-like material 18 such as aluminum foil and a pair of end caps 20. This package is basically formed in the following fashion.

First of all a suitable blank for the housing 14 is deposited at the blank feeding station 1 upon a carrier of the forming and assembling conveyor 22 by means of the feeder 38. As the carrier 40 of conveyor 22 moves toward station 2 it cooperates with a mandrel 170 on conveyor 24 to progressively press form the flat blank into the tubular housing 14 of the package.

As the flights of the mandrel and forming and assembling conveyors 22 and 24 exit from station 2 they diverge outwardly relative to each other and with the formed tubular housing piece 14 of the package being still positively retained within the same carrier 40. After the second station is passed, the core piece 16 of the package is transferred and inserted through the spread slot 15 of the housing 14 at the third station which is located at a point of mergence between the paths of travel of the forming and assembling and core conveyors 22, and 26 respectively. After insertion of the core 16 through the spread slot 15 of the housing 14 to make up the two-piece sub-assembly 17 of the package and with the sub-assembly remaining on the carrier 40, carrier 40 then proceeds to station 4.

At station 4 the sub-assembly leaves the carrier 40 and becomes deposited on a lower conveyor 28. Conveyor 28 then cooperates with a conveyor 30 to apply the end caps 20 to the sub-assembly 17 at station 5.

In the modified form of the packaging apparatus 10' of FIG. 9 a corresponding number of stations 1–5 are employed in conjunction with a different construction and arrangement of the correlated and systematized endless conveyors 22', 24, 32 and 34. In this instance all conveyors are advantageously disposed at a slight upward angle, relative to a horizontal plane as viewed in FIG. 9. Accordingly, the forming and assembling conveyor 22' cooperates in the same fashion with the mandrel conveyor 24 as in the case of the conveyors 22 and 24 of the apparatus 10 of FIG. 8. The conveyor 22', however, is longitudinally extended beyond the mandrel conveyor 24 in order to properly underlap the core conveyor 32 and to effect transfer of the core pieces at the third station. Instead of using the superimposed conveyors 28 and 30 of the apparatus 10 of FIG. 8 for effecting the attachment of the end caps 20, the modified apparatus 10' utilizes but one conveyor 34 with a different carrier 340 for not only receiving the transferred sub-assembly 17 at the fourth station of the conveyor 22', but also for firmly grasping and surrounding the transferred sub-assembly of the package.

Although the modified carrier 40' of FIGS. 3–6 is mechanically biased to a closed position and cam operated to an open position in a similar fashion as carrier 40, it includes two pairs of additional finger elements biased to a closed position and also separately operated by cams to open positions relative to each other and the carrier 40'. These additional elements as hereinafter described cooperate not only to further extend the open position of the carrier 40' but also to center the flat blank 36 on the carrier 40' and retain the formed housing piece 14 within the carrier 40' for release of the mandrel and insertion of the core piece 16 into the housing piece 14 within the carrier 40'. By virtue of these additional elements on the carrier 40', the mandrel 170' is slightly modified as shown in FIGS. 4 and 7 and as will be more fully executed.

Turning to FIGS. 1, 1A and 1B the three piece package P for merchandising and dispensing a web or web-like material 18 as aforementioned includes a tubular housing 14, a core 16 about which is tightly wrapped a length of web or web-like material 18, and a pair of similar end caps 20. Since the packaging apparatus in accordance with the teachings of the instant invention advantageously forms the housing 14 initially from a flat blank as hereinafter set forth, it can preferably consist of a relatively flat sheet of paper or paper-like material. One suitable grade of flat paper material for forming the housing piece 14 of the package is commonly referred to in the paper industry as bendable chipboard. The chipboard used for the instant package is initially a flat blank 0.034" gauge and approximately 12¹¹⁄₁₆" long by 4⅛" wide wherein the longer edges can be serrated to define a cutting edge for the material to be dispensed from the package and the corners at the intersection of the edges can be beveled to prevent relatively sharp corners. The chipboard to be bendable and formable should have the further characteristics of a pulp density of 137 lbs. per 1,000 square feet, a moisture content in the range of 4.5% to 7.5% by weight and a relatively smooth surface finish. Among the significant characteristics of the preferred chipboard for the housing 14 is the fact that it is not only bendable into a fixed tubular shape as shown in FIG. 1A but also that when formed into tubular shape it is still sufficiently resilient for spreading open the slot 15 to effect release of the mandrel of the conveyor 24 at the end of the second station and to effect transfer and insertion of the core 16 through the spread slot of the housing at the third station.

The cylindrical core 16 of the three-piece package P, however, is preferably hollow and desirably consists of a pair of laminated strips of paper which can be laminated together in a suitable manner not shown by being spirally wound about a mandrel and adhesively bonded together during winding thereabout so as to produce a cylindrically shaped core 16 that can be on the order of 1¹¹⁄₁₆" in diameter, a gauge of 0.027" and an approximate length of 12⅛". It is to be observed here that the given length of the core 16 is relatively shorter than the length of the housing piece 14 so as to enable attachment of the end caps 20 to complete the package after insertion of the core. A core 16 of the aforesaid dimensions has been found to be of sufficient strength to carry a tightly folded length of web 18 having a width of 12" about the outer surface of the core 16.

The end caps 20, however, can be made of a suitable thermosetting or thermoplastic material, such as a polystyrene. The plastic end caps 20 can be formed by injection molding into the overall configuration as shown in FIGS. 1, 1A and 1B.

As is clearly evident upon an inspection of FIG. 1A, which is a cross-sectional view of the end cap 20, the inner end of the end cap has a boss 42 provided with a frustoconical surface which diverges outwardly toward the outer end of the cap 20. The outer end of the cap 20 includes an annular flange 44 having an inwardly facing axial recess 45. The frustoconical surface 42 facilitates positive attachment of the end cap 20 to one end of the core 16 while the recess 45 freely encloses the associated end of the housing 14 so as to close off the associated end of the housing 14 and the slot 15. Although not heretofore mentioned, the frustoconical surface 42 includes an annular shoulder intermediate its ends that acts as a stop in positioning the ends of the core 16 relative to the ends of the housing 14 upon attachment of the end caps 20. Upon final attachment of the end caps 20 in the aforedescribed fashion to the associated ends of the core 16 and housing 14 of the three piece package P of FIG. 1 is now in a completed form. For further information regarding the details of the three aforedescribed pieces 14, 16 and 20 making up the package, reference is drawn to the U.S. Patent 3,228,579 granted Jan. 11, 1966, to James Dong et al. The overall package forming apparatus and system will now be described.

The forming and assembling carrier 40 on the conveyor 22 for forming the flat blank 36 of chipboard of FIG. 10 into the tubular housing piece 14 of the package and for assembling the core piece 16 into the formed housing piece 14 generally comprises an openable and closable claw element 48 best shown in FIGS. 2 and 2A, and a supporting shaft 50 to which the claw element 48 is pivotally connected for advancement around the endless path of the conveyor 22.

The claw element includes pair of spaced angle members 72, two pairs of arms 54 and 54' and a flexible but non-stretchable forming blanket 52. Each angle member 72 preferably defines a 90° angle between its intersecting sections. The arms 54 and 54' intermediate their ends include a through aperture whereby one of the arms 54 and 54' of each pair is pivotally mounted to opposite ends of the shaft 50. To facilitate pivotal mounting of the arms 54 and 54' to the shaft a sleeve-type bearing with a radial flanged end generally indicated at 56 can be provided. In mounting the arms 54 and 54' at each end of the shaft, the arms 54 and 54' are disposed in scissors-like relation with the arm 54' being disposed inwardly of the arm 54. In other words, the two arms outer 54 and inner 54' at one end of the shaft 50 are mounted in scissors-like relation to each other but in an inverse manner relative to the other two arms 54 and 54' mounted in scissors-like relation to each other at the opposite end of the shaft 50. By virtue of this inverse relationship, the outer arm 54 at one end of the shaft 50 and the inner arm 54' at the other end thereof are connected to the same angle member 72. Thus the remaining inner arm 54' at the one end of the shaft 50 and the remaining outer arm 54 at the other end of the shaft 50 is connected to the other angle member 72.

In connecting the inner and outer arms 54 and 54' at opposite ends of the shaft 50 to their associated angle member 72 a coupling plate 70 is employed which extends between the lower leg section of the angle member 72 and the upper end of the arm 54 or 54' as the case may be. The coupling plate at each end has an opening therethrough for passage of a capscrew fastener 74 whereby the opening at one end of the plate 70 can be aligned with an opening in the angle member 72 and the opening at the other end of the plate 70 can be aligned with an opening in the upper end of the arm 54 or 54'. This permits passage of the fasteners 74 through the aligned openings at each end of the plate 70 so as to effect threaded engagement of the fastener 74 in the usual manner whereby each angle member 72 is connected to the upper ends of the associated inner and outer arms 54 and 54'. Opposite edges of the forming blanket 52 which generally correspond in length to the angle members 72 are connected to the free edge of the upper leg section 76 of the angle members 72. More specifically, each one of the opposite edges of the blanket 52 is connected to the leg section 76 of the associated angle member 72 by the cooperation of a relatively narrow strip of sheet metal 78 and fastener elements such as rivets 77 only a few of which are generally shown in FIGS. 2 and 2A. The strip 78 corresponding in length to the angle member 76 is formed such as by bending to be approximately L-shaped in transverse cross section. The L-shaped strip 78 can then be placed over the free edge of the leg section 76 with one of the opposite edges of the blanket 52 being disposed therebetween. Thus upon passage of the rivets 77 through the strip 78, the edge of the blanket 52 and the leg section 76 of the angle member 72, the rivets 77 will act to firmly secure the edge of the blanket 52 to the associated angle member 72. Thus the blanket 52 with its opposite edges secured to the angle members 72 as aforedescribed extends between the angle members 72 to define a pocket 49, the advantageous purpose of which in forming the housing piece 14 and assembling the core 16 into the formed housing piece 14 is set forth hereinafter.

The lower end of the inner and outer arms 54 and 54' at opposite ends of the shaft 50 in conjunction with the opposite ends of the shaft 50 ride in endless but parallel spaced cams 104 of corresponding shape, only one of which is fragmentarily shown in dotted lines in FIGS. 2 and 2A. Suffice it to note here that the spaced endless cams 104 are affixed to the frame of the conveyor 22 the basic elements of which are diagrammatically shown in FIGS. 8 and 8A. The lower ends of the inner arms 54' include outwardly disposed longitudinal projections 58 which include a longitudinal opening therethrough. A wheel 62 is freely mounted to the forward end of each projection 58 by the medium of a pin-type shaft 64 the shank of which is forcefully inserted in a suitable manner into the aforementioned opening. Similarly the lower ends of the outer arms 54 include a longitudinal projection 60 with an opening therethrough that mounts the wheel 62 and the pin-type shaft 64 to the projection 60 in a corresponding fashion. The opposite ends of the shaft 50 include openings (not shown) for mounting another wheel 90 and shaft 92 in corresponding fashion as the shafts 64 and wheels 62 to the lower ends of the arms 54 and 54'. A washer W if desired can be disposed between a wheel 62 or 90 and its associated shaft. It is to be observed here that the set of mounted wheels 62 and 90 at each end of the carrier 40 preferably lie in the same plane such that the projection 58 of the inner arm 54' is of relatively longer length than the projection 60 of the outer arm 54. Further, the lower ends of the arms 54 and 54' include additional downward and outward projections 66 having transverse openings therethrough for passage of pins 67. The pins 67 at the lower ends of the projections 66 of the set of inner and outer arms 54' and 54 at each end of the shaft 50 are adapted to mount a pair of coil springs 68 in the manner illustrated in FIGS. 2 and 2A whereby the pair of springs 68 at each end of the carrier 40 mechanically bias the pocket 49 of the carrier 40 to a closed position such as shown in FIG. 2A.

The set of wheels 62 and 90 at each end of the carrier 40 are disposed in rolling engagement with associated endless cam 104 throughout the movement of the carrier 40 along its path of travel in the conveyor 22. By virtue of wheels 62 and 90 at each end of the carrier 40 being disposed in the same general channel of a cam 104 they can be received within the oppositely facing inner channel surfaces 106 and 108 which act as camming surfaces such that the cam surface 106 of each cam 104 is in engagement with its associated pair of wheels 62 at one end of the carrier 40 and the other cam surface 108 is in engegement with is associated wheel 90 at the one end thereof. As will be further apparent hereinafter the relative spacing between the surfaces 106 and 108 varies during travel of the carrier 40 around the path of the endless conveyor 22. When the variance in the spacing between the cam surfaces 106 and 108 is reduced to a minimum, the lower ends of the biased arms 54 and 54' at each end of the shaft 50 are pivoted outward relative to each other a scissorslike manner so that the pocket 49 at the upper end of the carrier 40 is pivoted to an open position such as shown in FIG. 2. Thus when the spacing between the cam surfaces 106 and 108 is increased the lower ends of the biased arms 54 and 54' at each end of the shaft 50 are pivoted towards each other so that the pocket 49 at the upper end of the carrier 40 is in a closed position in FIG. 2A.

It is noted here that the carrier 40, during its opening and closing by the cams 104, is driven along the cams 104 by a chain sprocket device mechanism further described in connection with FIG. 8B that includes an endless chain 94 partially shown in FIGS. 2 and 2A. The chain 94 is made up of three endless links affixed in lateral abreast relation to each other such that one of the outermost links on each lateral side of the chain 94 is connected to the underneath portion of the shaft 50 by an L-shaped bracket 100. Each of the L-shaped brackets 100 is affixed at one end to the associated outermost link of the chain 94 and at the other end it is affixed to the shaft 50 by a cap screw 102 in the usual manner.

The forming blanket 52 having the characteristics of flexibility and non-stretchability for carrying out the teachings of the instant invention is preferably made of a laminated material composed of strands of fiber glass crosswoven in a suitable fashion to give a sheet-like appearance. It is further composed of layers of a rubber-like material such as a suitable grade of silicone rubber covering the major faces of the woven fiber glass. In covering the woven fiber glass with the cover layers of silicone rubber, the rubber and fiber glass are for all practical purposes mechanically bonded together. The thickness of the rubber cover layers and the gauge of the fiber glass strands should be proportioned relative to each other so that the blanket 52 is preferably 0.050 inch in thickness. In addition, the non-stretchable and flexible blanket 52 has in being affixed to the carrier 40 a length as aforementioned corresponding to the length of the angle members 72 and a width approximating the width of the flat blank 36 (see FIG. 10) which is to be formed into the tubular housing piece 14.

Although not heretofore mentioned the upper end of the carrier 40 includes stop elements 80 affixed in a suitable fashion to the outer ends of the strips 78. These stops 80 function, when the carrier 40 is opened as shown in FIG. 2 and during its movement along the path of travel of the conveyor 22, to center the flat blank 36 between the stops 80 prior to insertion of the blank into the carrier 40 by the cooperative action of mandrel 170 and the associated carrier 40 at the blank forming station 2.

The upper end of the carrier 40 further includes novel finger elements 82 which are pivotally affixed to the angle members 72. Each finger element 82 is formed of sheet metal into a configuration approximating the shape of the letter V. One end portion of the element 82 includes spaced fully curled ends 84 while the other end portion includes spaced slightly curled ends 83 that advantageously function to positively grasp the longitudinal edges of the formed housing piece 14 in a manner to be hereinafter described. A connecting strip 87 partially shown in FIG. 2 is affixed to the upper leg section 76 of each angle member 72 inwardly of the aforedescribed strip 78. The longitudinal edge of the strip 87 farthest from the strip 78 includes spaced fully curled ends 86 corresponding in shape to the curled ends 84. The finger element 82 is pivotally connected to the strip 87 upon passage of an interconnecting rod 85 through the common longitudinal openings defined by the inter-fitting and alignment of the spaced curled ends 84 and 86 of the finger element and the affixed strip 87 as shown in FIG. 2.

The grasping end 83 of each finger element 82 is beneficially disposed at a relatively greater acute angle to the intermediate portion thereof than the hinged end 84 in order for the fingers 82 to pivot to a fully closed position when the carrier 40 is in an upright position and to naturally pivot to a downwardly draped position due to the effect of gravity when the carrier 40 is in an inverted position. In other words, the angular disposition of the end portions 83 and 84 relative to the intermediate portion of the finger element 82 is such that the center of gravity of the element 82 is always located relative to the pivotal axis of the finger element 82 about the rod 85 so that the finger element 82 naturally pivots to the fully closed position when the carrier is in an upright position.

As further noted hereinafter the fingers 82 when in the closed position positively grasp and retain the formed housing 14 without interfering with the removal of the mandrel 170 at the end of the blank forming station or the insertion of the core 16 at the core transfer station. The fingers 82, however, when in the open position, permit release of the housing 14 with the inserted core 16 from the carrier 40 at the fourth station of the apparatus in FIG. 8.

In the modified carrier 40' of FIGS. 3-6 it is to be understood that parts corresponding to those of the aforedescribed carrier 40 will be given corresponding reference numerals. The upper end of the carrier 40', however, is constructed and arranged in a different manner from carrier 40 in that additional pairs of finger elements 440 and 442 are employed. They are pivotally connected to their associated set of inner and outer arms 54 and 54' at opposite ends of the shaft 50. The finger elements 440 beneficially function to additionally open the carrier 40' so that the non-stretchable, flexible forming blanket 52 in its fully opened position is extended to a flat, taut position. The other finger elements 442, however, beneficially function not only to positively retain and grasp the formed housing 14 for release of the mandrel 170' at the end of the second station and to provide for insertion of the core 16 at the third stations but also to positively hold the centered blank 36 prior to its insertion at the second station into the carrier 40' by the mandrel 170'.

Accordingly, to pivotally mount the fingers 440 and 442, the upper ends of all arms 54 and 54' are extended by correspondingly shaped blocks 444. The interconnecting ends of the blocks 444 are reduced to an intermediate flat portion 446 that is affixed to the upper end of all arms 54 and 54'. To this end, a machine screw 448 is passed through the opening in the upper end of the arm 54 or 54', as the case may be, for threaded engagement with the aligned opening in the block portion 446 in the usual manner by a suitable tool as illustrated in FIG. 5. The upper or free end of the blocks 444 includes a transverse opening therethrough such that the openings in the blocks 444, associated with it set of inner and outer arms 54 and 54', are longitudinally alignable for passage of a rod 450 therethrough. Each rod 450 through its associated set of inner and outer arms 54 and 54' acts to separately mount the lower and upper fingers 440 and 442 for pivotal movement.

The fingers 440 and 442 are made up of flat strips of formable sheet metal of substantially the same size. Accordingly, the flat end portions 452 and 454 of the lower finger 440 are slightly bent relative to each other to define an intermediate substantially straight fold line between the end portions 452 and 454 and to define an angle less than 90° therebetween. The other or upper finger 442 includes end portions 456 and 458 bent relative to each other in a similar fashion. The free edges of the end portions 454 and 458 of the fingers 440 and 442 include spaced ear projections 460 and 462 respectively of relatively different lengths as best shown in FIG. 3. The ear projections 460 on the lower finger 440 are fully curled in a circular fashion by bending the projections 460 upwardly and then downwardly relative to the end portion 454 of the lower finger 440. Similarly, the ear projections 462 of the upper finger 442 are fully curled into a corresponding circular shape by bending the projections 462 downwardly and then upwardly relative to the end portion 458 of the upper finger 442. The curled projections 460 and 462 of different lengths are interfitted and aligned relative to each other as shown in FIG. 3 so as to define a common opening through the projections 460 and 462 for passage of the rod 450. Thus, upon passage of the rod 450 through the aligned openings of the curled projections 460 and 462 and of the blocks 444 for the arms 54 and 54', the fingers 440 and 442 can be pivotally mounted to the said blocks 444 as illustrated in FIGS. 3-6. It is further observed here that the interfitting and alignment of the ear projections 460 and 462 of different lengths is done in such a manner that the passed rod 450 includes exposed portions inward of and adjacent to the blocks 444 of the inner and outer arms 54 and 54' as illustrated in FIG. 3. The upper end of the blocks 444 includes intersecting surfaces defining an inwardly facing L-shaped recess 463 best shown in FIG. 5 wherein the surface 465 of the recess acts as a stop for the closed position of the lower finger 440. When both upper and lower fingers 440 and 442 are in a closed position relative to their associated blocks 444, the fingers 440 and 442 are disposed in parallel relation to each other as shown in FIG. 4.

The end portions 452 of lower fingers 440 are affixed to the opposite ends of the forming blanket 52. The ends of the blanket 52 are affixed in a similar fashion as aforedescribed to the carrier 40, whereby the blanket is clamped between the end portion 452 of a finger 440 and the flat strip of metal 464. The flat strip 464, together with blanket 52 disposed between the strip 464 and the end portion 452, is fastened by capscrews 466 in the usual manner to the end portion 452 of each finger 440, as shown in FIG. 4. Each of the fingers 440 are biased to their closed position by a pair of coil springs 468, only one of which is shown. One end of a spring 468 is connected to a separate hook 470 located in a suitable manner on the end portion 452 of the finger 440. Transverse strap members 472, each of which is slightly bent intermediate its ends, are affixed by screws 474 as shown in FIG. 3 to the ends of the support shaft 50 inwardly of and adjacent to the inner arms 54'. The outer ends of each strap member 472 include an opening for receiving the other end of the coil spring 468. Thus each spring of the pair of coil springs 468 for each finger 440 is individually connected at one of its ends to the outer end of a strap member 472, while being connected at the same time at the other end to a hook 470 on a finger 440. From the above it is obvious that the heavy duty coil springs 468 act to bias the associated lower finger 440 to a closed position.

11

The upper finger 442 is mechanically biased to a closed position relative to the lower finger 440. At least one arcuately shaped pin 476 is passed through aligned openings (not shown) located in the end portions 458 and 454 of the upper and lower fingers 440 and 442, whereby the centers of the aligned openings lie substantially radially equidistant from the pivotal axis of the rod 450. The lower end of the pin 476 includes an enlargement for retaining the lower end of a coil spring 478 which has been loosely assembled to the pin 476 and which is also substantially weaker than a coil spring 468. The upper end of the pin 476 is connected to the upper finger 442 by the threaded engagement of a nut 480 in a well-known manner as shown in FIG. 4. When the upper finger 442 is pivoted to an open position by a cam 484 to be subsequently described relative to the lower finger 440, the upper end of the relatively weak spring acts against the enlarged portion of pin 476. In other words, by virtue of the particular disposition as well as the relationship between a weak spring 478 and a strong spring 468 it will be obvious that when a cam 484 actuates a finger 442, it is cammed to an opened position relative to the lower finger 440 all to be described more fully hereinafter.

In addition to the arms 54 and 54' of the carrier 40' being cam actuated to an opened position by the cam 104 in the same fashion as aforedescribed in connection with the carrier 40, the biased fingers 440 and 442 are individually cam actuated to open positions by their own cams 482 and 484. The cams 482 and 484 are affixed to the frame of the conveyor 22 as illustrated in FIG. 6 in lateral spaced relation to the cam 104 and in lateral spaced relation to each other. One longitudinal end of the lower finger 440 has a cam follower 486 affixed thereto and consisting of an L-shaped member 488 and a wheel 490. The smaller leg section of the member 488 is affixed such as by welding to one of the longitudinal ends of the finger 440. The lower end of the larger leg section of the member 488 mounts the wheel 490 for free rotation by a stub shaft 492 passing through the hub of the wheel 490 and rigidly affixed by welding to the lower end of the member 488. The upper finger 442 provides a similarly shaped cam follower 494 having a relatively larger L-shaped member 496 and a wheel 498. The upper leg section of the member 496 is affixed at its free end to the longitudinal end of the upper finger 442. Thus the member 496 overlies member 488. The lower end of the follower 494 has the wheel 498 mounted for free rotation about the stub shaft 500 which is affixed to the free and lower end of the follower 494 in a corresponding fashion as the aforedescribed wheel 490. Thus, during movement of the carrier 40' along the cam 104 in FIG. 8C as hereinafter further described, the wheels 498 and 490 of the upper and lower fingers 442 and 440 rollingly engage the upper surfaces 502 and 504 of the cams 482 and 484, whereby the arms 442 and 440 are controllably pivoted about their associated rods 450 relative to each other as well as relative to the associated arms 54 and 54'.

The free end of the end portion 456 of each of the upper arms 442 has a pair of lug elements 506 affixed thereto and a pair of stop members 508. The lug element 506 is approximately of L-shaped configuration with the relatively longer leg thereof being affixed underneath the forward end portion 456 of the upper finger 442. The shorter leg of all lug elements 506 on both upper fingers 442 all cooperate to positively grasp and retain the formed housing 14 in the carrier 40'. It is to be further understood that the lug elements 506 on the upper fingers 442 of the carrier 40' are spaced relative to each other so as to avoid interference with each other. The stop members 508 are desirably spaced outwardly of the lugs 506 on the upper fingers 442 in FIGS. 3 and 4 to assure retention of the fed blank 36 as well as a centering of the blank relative to the carrier 40'.

As indicated in FIG. 4, the forward ends of the lug elements 506 project into suitably shaped recesses 171 in the mandrel 170'. Each recess 171 is dimensioned to freely accommodate the forward end of the associated lug element 506. In view of the above description of the carriers 40 and 40' the packaging apparatus and system of FIG. 8 will now be set forth, wherein this apparatus and system advantageously incorporates the carrier 40 or 40' as the case may be.

Any suitable feeding mechanism can be used to deposit the flat blank 36 onto each carrier 40 at the first station as it moves past the same. In this instance, the feeding mechanism 38 as best shown in FIG. 10 comprises a rotary vacuum transfer device 114 and a magazine 112 for storing a supply of stacked-together blanks 36. In the instant invention, the rotary device 114 includes a plurality of hollow rods 116 equally spaced around and projecting radially outward of the shaft 118 which is rotatably supported by the frame of the device only part of which is shown. The outer end of the hollow rods 116 has a suction disk 120 affixed thereto. The magazine 112 on the other hand comprises a frame, only part of which is shown, made up of angle members to support the stacked-together blanks on their bottom edges in an upright position such that the top-most blank 36 has its outer face contacted by a pressure stacking device generally indicated 122.

Device 122 functions to keep the remaining blanks in stacked together relationship after feeding of the bottommost blank onto a suction disk 120 of the transfer device 114. An electric motor or the like (not shown) is employed to rotate the shaft 118 and to drive a pump to supply an active vacuum in a well known manner to a disk 120 whereby the vacuum disk 120 will pick up the bottom-most blank 36 as it passes the magazine 112. After pickup, disk 120 timely releases and deposits the picked-up blank 36 onto the carrier 40 passing underneath the feeding mechanism 38 at the first station. A guard strip 124 of arcuate configuration projecting downwardly from the magazine acts to guide the forward edge of the picked-up blank 36 as it moves toward the carrier 40. In the event of an inadvertent release of the picked-up blank on the associated suction disk 120, the guard 124 acts to guide the blank 36 for proper deposit onto the associated carrier 40 passing underneath the feeding mechanism 38.

The fed blank is advantageously deposited onto the carrier so that its forward and trailing edges when considered relative to the direction of travel of the carrier 40, are disposed between the stop members 80 of the carrier 40. When the forward and trailing edges are disposed between the stop members 80, the edge portions of the blank 36 are in nesting contact on the grasping portions 83 of the fingers 82 as shown in the last carrier 40 on the right in FIG. 10.

Prior to cooperation of the mandrel conveyor 24 with the forming and assembling conveyor 22 at the second or blank forming station, it has been found that moistening the surface of the deposited blank 36 enhances formation of the blank 36 into the tubular housing 14 of the package 12. An auxiliary moistening device 126 is therefore mounted on the frame of either embodiment 10 or 10' of the apparatus between the first and second stations. This moistening device is schematically shown in FIG. 10 and merely comprises a regulating or mixing device 128 to which separate supply lines 130 and 132 for pressurized air and water are respectively connected. The air line 130 has an operator control valve 134 and an electrical timing device 136 series-connected thereto. Similarly, the water line 132 includes an operator control valve 138. Upon opening of the control valves 134 and 138, a proper flow of water and air are admitted into the regulator 128.

Mixing device 128 includes suitable control elements (not shown) for intermittently directing an appropriate atomized spray of air and water through the nozzle 140 onto the opposed surface of the blank 36 passing underneath the nozzle 140.

The mandrel conveyor 24 in the packaging apparatus 10 of FIG. 8 is located next to the moistening device 126 and is disposed above and in operative relation to the upper flight of the forming and assembling conveyor 24. The mandrel conveyor 24 includes laterally spaced endless chains 142 as shown in FIG. 12, a pair of tracks 144, a pair of driven sprocket gears 146 and 148, and a plurality of mandrels 170 affixed to the spaced chains 142 for movement along the endless path of travel of the conveyor 24. The mandrels 170 are preferably affixed to the chains 142 in equispaced relation. Although not heretofore mentioned, a plurality of carriers 40, usually greater in number than the mandrels 170, are affixed in corresponding equispaced relation to their endless chains 94 on the conveyor 22 as aforedescribed. Each mandrel 170 is removably affixed at its longitudinal ends to the spaced chains 142 by interconnected angle members 172 and 174. The longer section of an angle member 172 includes at its free end a cylindrically shaped plug 175. The reduced end of the plug 175 as shown in FIG. 12 is keyingly locked within a closed end opening at one end of the mandrel 170 by means of a locking pin or key 176. The other angle member 174 has one section affixed to the smaller section of the angle member 172 while the other section of the angle member 174 is affixed in a suitable manner to the inside link of the associated chain 142. The endless chains 142 are directed around the endless path of the conveyor 24 by sprocket gears 146 and 148. Located between the spaced sprockets 146 and 148 associated with each chain 142 are cam tracks 144 which are supported by an angle member 152 on the frame of the conveyor 24. Although the frame of the conveyor 24 is not shown in complete detail, it includes angle members 154 and 156 affixed together as shown in FIG. 12. Angle members 156 are reinforced by spaced gusset members 158, only two of which are illustrated, for supporting a heating oven 160 for the mandrel 170. One leg of the angle member 152 is affixed to the frame member 154 while the other leg of the angle member 152 has a cam track 144 attached thereto. A pair of cam tracks 144 are associated with each chain 142 and these cam tracks extend between the sprockets 146 and 148 along the upper and lower flights of travel of the conveyor 24. The upper cam track 144 has a straightaway for a selected portion of the movement of the conveyor while each of the lower cam tracks 144 includes two successive straightaway sections 144a and 144b, see FIG. 11, disposed at an acute angle relative to each other. This relative disposition of the lower cam tracks 144a, 144b, as will be further described, advantageously directs the endless chains 142 and the mandrels 170 in a downward and outward path toward the upper flight of the forming and assembling conveyor 22. The upper cam tracks 144 direct the mandrels 170 through the length of the heating oven 160 which advantageously overhangs and heats the mandrels 170 to a predetermined temperature by radiation whereby the heated mandrels 170 enhance the forming of the moistened blank 36 into the tubular housing piece of the package P.

The oven 160 can be of any commercially available design and includes a series of insulated walls 162, 164 and 166 constructed and arranged so as to satisfactorily enclose and heat the mandrels 170 during their passage through the oven 160. The wall 162 is affixed at its ends to and extends between the spaced frame members 156 of the conveyor 22 in FIG. 12. One leg of each wall 164 is affixed to its associated frame member 156 so as to be in abutting contact with the overlying end portion of the upper wall 162. The remaining wall 166 is intermediately disposed between the opposing free end portions of the other leg sections of the walls 164 by means of a pair of channel-shaped sheet members 168. With the walls 162, 164 and 166 affixed as aforedescribed, the opposing ends of the walls 164 and 166 are slightly spaced from each other to provide sufficient clearance for free passage of the supporting members 172 of the mandrel 170 through the oven 160. Thus it is evident as noted in FIG. 12 that the walls 162, 164 and 166 are constructed and arranged to define an effective oven 160 disposed in the path of the upper flight of the conveyor 24 for heating the mandrels 170 by radiation as the mandrels travel therethrough. Although not shown, it is to be understood that the walls 162, 164 and 166 can include means for mounting appropriate heating elements for heating the oven 160 to the desired temperatures.

The lower path of flight of the mandrels 170 and the upper path of flight of the carriers 40 advantageously have portions of their paths of travel disposed in parallel cooperative relationship through the blank forming stations to form the flat blank 36 into the tubular housing piece 14. As is evident from an inspection of FIG. 11 the paths of travel of both conveyors 22 and 24 converge toward each other at their entrance to the blank forming station. During this convergence the mandrels 170 are moved downwardly and outwardly while the carriers 40 are moved simultaneously upwardly and outwardly. During the aforesaid conveyor convergence, the carriers 40 which have remained in an open position from station 1 are now moved upwardly by the action of the joint rise of the cam surfaces 106 and 108 in zone B of FIG. 8A and due to the rolling engagement of the rollers 62 and 90 on the carriers 40 with the aforesaid cam surfaces. During this convergence between the conveyors 22 and 24, the mandrels 170 are aligned with the underlying and associated carriers 40 by virtue of the mandrels 170 and carriers 40 being correspondingly equispaced on their respective chains 142 and 94 as aforedescribed and with the chains 94 and 142 being driven in appropriately timed relation.

As the mandrel 170 and an associated open carrier 40 converge with each other, the deposited flat blank 36 is progressively and forcibly inserted by the mandrel 170 into the pocket 49 of the open carrier 40 whereby the inserted blank at the final point of convergence between the mandrel 170 and the open carrier 40 is in surface-to-surface contact with the draped blanket 52 of arcuate configuration. Further, at this point of convergence as illustrated in FIG. 11, the mandrel 170 is disposed within the pocket 49 of the open carrier 40 and with its outer cylindrical surface in tangential contact with an intermediate portion of the upwardly facing surface of the inserted blank. In other words, during convergence of the mandrel 170 and carrier 40, the inserted blank is gradually shaped into an arcuate configuration. From the final point of convergence between the mandrel 170 and associated carrier 40 until the mandrel 170 is released from the associated carrier 40 at the end of the blank forming station (see FIG. 13) the paths of travel of the inserted mandrel 170 and carrier 40 remain parallel to effect the arcuate forming of the inserted blank 36.

The carrier 40 and mandrel 170 maintains their parallel relationship, after the final point of convergence at the common point between zones B and C in FIG. 8A, as well as throughout the zones C, D, and E which also comprise portions of the path of travel of the carrier 40. This parallel relationship is required during travel of the carrier 40 and mandrel 170 through zones C and D in order to provide ample time to press form the blank into the tubular housing piece 14. The carrier 40 during its movement through zone C is closed at a rapid rate since the cam surface 106 diverges downwardly and outwardly in a straight line relative to the other cam surface 108 as indicated at 79 in FIG. 8A. This divergence of the cam surface 106 at zone C effects a rapid pivoting of the upper ends of the biased arms 54 and 54' towards each other about the support shaft 50 of the carrier 40 so as to effect wrapping of the blanket 52 about the surface of the inserted mandrel 170. During this wrapping, the inserted blank is sandwiched between the mandrel 170 and the blanket 52. Thus, the wrapping of the blanket 52 during passage of the same through zone C effects a folding and press forming of the arcuately shaped blank about the surface of the mandrel 170. During passage of the carrier 40 through zone D, the carrier blanket 52 enshrouds the inserted mandrel 170 and the blank for the length of time required to positively press form the folded blank into the tubular piece 14. As aforementioned, the heating of the mandrel 170 and the moistening of the blank 36 advantageously contribute to the overall press forming or molding of the blank into the tubular piece 14 whereby deleterious creasing, crinkling, or scoring is obviated during the press forming. On the other hand, this treatment does not seriously detract from the ability of the blank to take a permanent set and with the free longitudinal edges thereof having a certain amount of springback. At zone E of the path of travel, the carrier 40 is reopened by action of the cam surfaces 106 and 108 to effect initial release of the mandrel 170 at the point of mergence of zones D and E.

In order to fully reopen the carrier 40 in its passage through zone E, the cam surface 106 converges upwardly and outwardly in a straight line in zone E toward the cam surface 108 as indicated at 91 in FIG. 8A. At the common point between zones E and F the spacing between surfaces 106 and 108 has converged to a relative minimum therebetween. As the cam surface 106 converges toward surface 108 as indicated at 91 in zone E, the upper ends of the arms 54 and 54' are pivoted away from each other about the shaft 50, thereby reopening the pocket 49 of the carrier 40, unwrapping the blanket 52 from the mandrel 170 and thereafter allowing the blanket to reassume a draped position as shown in FIG. 13. Although not heretofore mentioned, during passage of the carrier 40 through the second station, the fingers 82 of the carrier are in a closed position. When the fingers 82 close, such as at the second station, the end portions 83 thereof positively grasp the forward and leading edges of the inserted blank so that upon reopening of the carrier 40, the slot 15 of the tubular housing piece 14 is spread open and retained in surface-to-surface engagement with the upwardly facing surface of the redraped blanket 52. Upon this reopening of pocket 49 of the carrier 40, as aforedescribed, together with the proper spreading apart of the free edges of the housing 14 by means of fingers 82, the mandrel 170 is free to glide out of the grasp of carrier 40. The mandrel begins to glide away from carrier 40 at the point of mergence of zones E and F on cam track 104. Upon the complete disengagement of the mandrel 170 and carrier 40, each renews its separate and divergent path of travel.

The reopened pocket 49 of the carrier 40 with the retained and spread-open housing piece 14 then travels through arcuate zone F of constant radius and defined by cam 104 for the purpose of inverting the carrier 40 from its upright position to its upside down position prior to convergence of conveyors 22 and 26 and the transfer and insertion of the core 16 at the third station.

The core carrying conveyor 26 of the packaging apparatus of FIG. 8 consists of a pair of endless tandem related conveyors 180 and 190. With reference to FIGS. 8, 15, and 16, the first tandem conveyor 180 includes a pair of laterally spaced endless chains 184 of a suitable chain-link type, a plurality of V-shaped carriers 182 affixed at their ends in an equispaced manner to the spaced chains 184 and a pair of driving sprockets 186 on a support shaft 188 at each end of the conveyor 180. Although only one shaft 188 and one pair of sprockets 186 are shown in FIGS. 8 and 15, it is to be understood that the shafts 188 and pair of sprockets 186 at each end of the conveyor 180 are suported by the frame of the conveyor 26 in a known manner. The upper movements of the conveyors 180 and 190 as viewed in FIG. 8 are in the same direction; namely, right to left. The function of the V-shaped carrier 182 is to receive the core 16 about which a web 18 has been tightly wrapped and thereafter transfer the cores 16 onto the next tandem conveyor 190.

As indicated in FIGS. 8 and 15, conveyor 190 comprises a pair of laterally spaced endless chains 192 coincidentally aligned with the chains 184 of the conveyor 180. Chains 192 pass around the separate pairs of sprocket gears 193 and 196 supported on their respective shafts 198 and 200. The shafts 198 and 200 are carried by the frame of the conveyor 26, as indicated in FIGS. 8 and 15, in a known manner.

Pawls 202 are pivotally affixed in equispaced relation on their associated chains 192 as well as being aligned with one another. The pawls 202 serve a dual function. Firstly, they grasp the longitudinal ends of the core 16 to effect transfer of the core from the V-shaped carrier 182 to the conveyor 190. Secondly, they effect insertion of the core 16 into housing 14 at the third station.

The upper free end of a pawl member 202 includes outwardly convergent spaced edges 204 that intersect to define an apex 206 that can be rounded off as shown in FIG. 17. The opposite end of the upper edge 204 has a shoulder 208. The other edge 204 has a rounded off portion 210 that merges with an inwardly recessed portion 212 disposed along the inwardly facing edge on the intermediate portion of the pawl member 202. As will become apparent from an inspection of FIG. 17, the convergent edge 204 permits a pawl 202 to slip easily inside of an end of the hollow core 16. The shoulder 208 and the rounded convex edge 210 on each of the longitudinally aligned pawls 202 cooperate not only to positively grip the ends of the core 16 without buckling, but also to properly orient the core 16 relative to pocket 49 of the carrier 40.

The manner in which each pawl 202 is pivotally affixed to its associated chain 192 is now to be set forth. The vertical leg of a right angle member 214 is affixed to an inside link of the chain 192. The other leg of the angle member 214 includes an upwardly directed bifurcated portion 216 that pivotally connects the lower end of the pawl member 202, when a pin 218 is passed through aligned openings in the pawl member 202 and the bifurcated portion 216. Although not shown, appropriate biasing means for the pawl 202 can be provided such as a coil spring disposed about the pin 218 in a known manner so that the pawl can be biased to an open position.

The pawl members 202 particularly during the upper path of travel of the conveyor 190 are pivoted by a cam means into a position for positively engaging the associated end of the core 16. These cam means comprise a pair of spaced rods or track elements 220 and a follower rod 222. One end of rod 222 is located between the spaced cam rods 220 while the other end of rod 222 is connected to the pawl member 202. The spaced cam rods 220 generally follow the path of travel of the chains 192 of the conveyor 190 as best shown in FIG. 14.

The chains 192 particularly during their path of travel in the up position between driving sprocket gears 193 and 196 can advantageously be supported and guided by cam tracks 224 and 226 as indicated in FIG. 14. The cam track 224 although only partially shown in FIG. 14 is located along the upper path of travel of the conveyor and acts to support and control movement of the endless chains 192. The function of cam track 226 during a portion of the upper path of travel of the conveyor 190 is to direct the chain in an upward inclined direction so as to facilitate insertion and transfer of the core 16 into the open pocket 49 of forming carrier 40 at the third station. The cam track 226 for directing the chain 192 upwardly includes an inwardly facing and somewhat H-shaped recess 228 (see FIG. 17) defined by inwardly extending and intersecting surfaces of the cam 226. The opposed surfaces defining the recess 228 further include opposite protruding portions 230 that function to prevent lateral shifting of the chain 192 while at the same time permitting free travel of the chain 192 therethrough.

The spaced cam rods 220 for controllably pivoting the pawl member 202 are affixed to the frame of the conveyor 26 (not shown) or to the top surface of the cam 226 as shown in FIG. 17 so that the spaced rods 220 can be adjusted relative to each other as well as with respect to the pivotal movement of the pawl member 202 about the axis of pin 218. The spaced cam rods 220 on each side of the conveyor 190 include a series of spaced ear type lobes 232, only two of which are shown in FIG. 17, which project laterally outward from the rod 220. The spaced lobes 232 at their outer ends have openings that can be aligned for passage therethrough of a stud bolt 234. The lower end of the stud bolt 234 is affixed in a suitable fashion to a threaded opening on the cam 226 or the frame of the conveyor 26 (not shown) as the case may be. Lock nuts 236 are disposed in threaded engagement in a known fashion with the stud 234 on either side of the spaced lobes 232 during passage of the bolt 234 through the aligned openings of the lobes 232. As is evident from an inspection of FIG. 17, the lock nuts 236 on either side of the spaced lobes 232 permit adjustment of the lobes or projections 232 relative to each other. Consequently, adjustment of the projections 232 can enlarge or reduce the spacing between the rods 220 or adjust the elevation of the spaced rods 220 relative to the pivotal axis of the pin 218 for the pawl 202.

From the above, it is now apparent that any adjustment of the spaced rods 220 on each side of the conveyor 26 will in turn effect the pivotal position of the pawls 202.

The manner in which the core conveyor 26 effects transfer and insertion of the core 16 at the third station into the housing piece 14 of the package located within the carrier 40 will now be described. As indicated in FIGS. 8, 15 and 16 the paths of travel of the conveyors 180 and 190 overlap at one of their ends. The overlap is in an amount sufficient to effect engagement of the longitudinally aligned pawl members 202 on the chains 192 with the cores 16 and a falling away of the V-shaped carriers 182 from the pawl engaged cores.

The chains 184 and 192 are driven in timed relation by the drive mechanism of FIG. 8B to be subsequently described. Thus, as the V-shaped carriers 182 and pawls 202 overlap in FIG. 16 it is evident that the cores 16 are timely transferred to their associated pawls 202 without interfering with the paths of travel of the conveyors 180 and 190.

It is to be recalled that at this time in the sequence of operations, the particular carrier 40 which was discussed above has been reopened but with the formed housing piece 14 still being retained against the blanket 52 and spread-open by the action of the fingers 82. After the reopened carrier 40 has been inverted at the end of zone F in its path of travel, the cam 104 directs the opened carrier 40 through a downward and outward path of travel in zone G, as indicated in FIGS. 8A and 14. At this same time, the cams 226 associated with the chains 192 of the conveyor 190 direct the longitudinally aligned pawls 202 along with a pawl engaged core 16 upwardly and outwardly toward the associated carrier 40.

Bearing all of this in mind, it will now be understood that during the path of travel of the carrier 40 through zone H of the cam 104, which is a relatively short path of travel, the core will become inserted in the housing 14 on the carrier as the carrier and pawls 202 travel together side by side and the pawls transfer the core to the housing 14 on the carrier.

Immediately after passage through zone H, the carrier 40 recloses and at the same time the pawls 202 become dislodged from the transferred core. Reclosure of carrier 40 is effected by the appropriate contour of cam surface 106 at zone H as indicated at 238.

It should be noted here that in order to keep pocket 49 of the carrier 40 open after leaving station 2 and until it reaches station 3 so that the core 16 can be readily inserted in the housing 14 as aforedescribed, the blank 14 remains in positive engagement with the blanket 52 as well as end portions 83 of the fingers 82. As illustrated in FIG. 14, the spring-back characteristics of the blank 14 now advantageously act to hold the fingers 82 in a closed position by virtue of the separating forces applied to the fingers 82 by the blank 14.

After the insertion of the core 16 into the spread-open housing 14 located within the pocket 49 of the carrier 40 at the third station, the pocket is reclosed by the action of the camming surfaces 106 and 108 at zone H whereby the blanket 52 closes and re-enshrouds the housing 14 so as to retain housing 14 along with the inserted core 16 within pocket 49. As the edges of the blanket 52 are drawn together, the outward pressure of the blanket 52 against the blank 14 is released, thereby allowing the normal spring-back characteristics of the blank 14 to come into play so that the free edges of the blank come together. As the edges of the blank come together, the finger separating forces exerted by the blank on the fingers 82 are relaxed, thereby effecting disengagement of the fingers 82 from the blank 14. Thus, the fingers 82 are now free to pivot as indicated in FIG. 14 to their fully open position under the influence of gravity.

The forming carrier 40 with the sub-assembly of the housing 14 and inserted core 16 then remains closed as it advances through zone I as referenced by the cam 104 of FIG. 8A. The forming carrier is again reopened at zone J of cam 104 to release the sub-assembly 17 comprising formed housing 14 and core 16 from the carrier 40 whereupon the sub-assembly 17 drops under the influence of gravity onto an upwardly facing open saddle type carrier 242 of the lower end cap assembly conveyor 28 at station 4 in the manner indicated in FIG. 18. As carrier 40 leaves zone J with the sub-assembly 17 released therefrom and re-enters zone A, pocket 49 of the carrier is maintained in an open position due to the action of the camming surface 106 on the wheels 62 for the arms 54 and 54'. Upon re-entry into zone A, the carrier is reinverted to its upright position for receiving another blank at station 1 and thereafter recycles in the manner aforedescribed.

It is further observed here that the carrier 40 as shown in FIG. 2A further includes a leaf-like spring S affixed to the supporting shaft 50 by a pair of set screws 103. The spring S primarily acts at station 4 to assist release of the sub-assembly 17 when the pocket 49 of the carrier 40 is reopened by the action of the cam 104 at zone J as described above.

Each carrier 242 includes a sheet metal saddle element 244. The forward and trailing ends of saddle 244 are slightly curled so as to facilitate cooperation with the correspodingly shaped carrier 246 on the superimposed or upper end cap assembly conveyor 30, all as indicated particularly in FIG. 19. Each carrier 242 is mounted on a cross bar 256, the ends of which are attached to the laterally spaced chains 247 best shown in FIG. 21. Bars 256 and carriers 242 are appropriately spaced with respect to each other so as to be able to fully cooperate both with carriers 246 on the upper and superposed conveyor 30 as well as carriers 40 on conveyor 22.

Similarly, the other saddle carriers 246 are affixed to cross bars 256 located on laterally spaced chains 251 in a fashion similar to the cross bars 256 of carrier 242. The endless chains 251 of conveyor 30 are trained around their sprockets 252 and 254 respectively carried on shafts 252' and 254' at the ends of the upper conveyor 30. As is evident from a review of FIGS. 8 and 8B, the upper conveyor 30 is of relatively shorter overall length than the lower conveyor 28 whereby the forward end of the upper path of travel of the conveyor 28 can be located at the fourth station adjacent and under the terminal end of the lower path of travel of the carrier 40 on the conveyor 22. After transfer of the sub-assembly 17 from the carrier 40 to the carrier 242 at the fourth station, all as indicated in FIGS. 18 and 19, the carrier 242 with the sub-assembly 17 is then disposed in parallel operative relation with the lower path of travel of the carriers 246. The merged paths of travel of carrier 242 and 246 continue in a leftward direction as viewed in FIG. 19 for a sufficient period of time to permit attachment of end caps 20 to the sub-assembly at station 5. During this mergence of the paths of travel of conveyors 28 and 30 in FIG. 19, a carrier 242 of the conveyor 28 carrying a transferred sub-assembly 17 from station 4 to station 5 mates with the other inverted saddle-shaped carrier 246 of the superposed conveyor 30 to form a segmented tunnel-like sleeve encompassing the transferred sub-assembly 17.

During the time the sub-assembly 17 remains within the sleeve, the spring-back characteristics of the housing edges act to retain the sub-assembly 17 in positive frictional and relatively non-slipping engagement with both carriers making up the sleeve as the housing is partially collapsed by the closing of the mated carriers. This collapse of the housing is not significant enough to cause a binding of the housing and the core. Thus, the core is permitted to advantageously slide relative to the housing for a purpose to be discussed more fully hereinafter. In any event, the collapse of the edge of the housing 14 is such that the engaged housing at either end does not assume a radius beyond the radial extent of the annular recess 45 of the end cap 20 of the final package.

Turning to FIGS. 20 and 21, the conveyor 28 is illustrated in further detail. These figures of the drawings also disclose the mechanism for attaching the end caps 20. The end caps 20 are fed from a suitable hopper mechanism (not shown) down a pair of laterally spaced chutes 422. The lower ends of these chutes are affixed to the top surface of plates 425 which constitute an upper part of the frame of the conveyor 28. The chutes 422 can be made up of a backer plate 424 and two angle members 423. The angle members 423 are affixed to one side of the plate 424 so as to define a partially exposed passageway for free travel of the end caps 20 in stacked relation to the lower end of the chutes 422 adjacent the conveyor 28. The end caps 20 are initially oriented in their respective chutes 422 by means of the hopper mechanism (not shown) so that the boss portions 42 of the caps 20 face inwardly and protrude through the exposed portion of the passageway in associated chute 422, all as indicated in FIG. 21.

Although not heretofore mentioned, the mated carriers 242 and 246 include laterally projecting arms 245 and 257 (see FIGS. 18, 19, 20 and 21), the purpose of which is to engage the bottom-most end cap 20 in a chute 422 as the nested together carriers 242 and 246 move between and past the chutes. To facilitate transfer of the bottom-most end cap 20 in each chute 422 upon engagement by the arms 245 and 257, the lower ends of the angle members 423 are cut away relative to the lower end of the backer member 424 of the chute 422 as shown in FIG. 24 and by dotted lines in FIG. 20. The engaged caps 20 are then advanced by the arms 245 and 257 of the mated carriers 242 and 246 along the converging laterally spaced cams 428 so that the end caps 20 are progressively forced onto the ends of the housing 14 and at the same time wedged into the core 16 to complete the package P at the fifth and last station of the apparatus 10 in FIG. 8.

The cams 428 on each side of the conveyor 28 include a pair of plates 429 held in parallel spaced relation by blocks 430 and affixed to the associated top plate 425 of the conveyor 28 in a suitable manner by cap screws not shown. Further details of the chutes 422 and the converging cams 428 are set forth below in connection with the end cap attachment station of the modified apparatus 10′ in FIGS. 22 to 25 and 23A to 24A. It is sufficient to note here, however, that the three-piece package P is completed when the mated carriers 242 and 246 move just beyond the end of the cams 428.

The means for driving the various correlated conveyors of 22, 24, 26, 28 and 30 will now be described. All of the conveyors are drawn by a common interconnected drive means as indicated in FIG. 8B. This means includes an appropriate electrical motor 260. This motor is connected to a worm gear mechanism 262 for driving sprocket gear 264. The driving sprocket 264 carried on shaft 262′ then drives the sprocket 266 affixed to shaft 98′ that is in intermeshed relationship with a sprocket 268 affixed to shaft 148′ on the mandrel conveyor 24. Thus, the conveyors 22 and 24 are driven by the intermeshed relationship of the gears 264, 266, and 268. The intermeshing of the gears 266 and 268 guarantees that the lower path of travel of the mandrel conveyor 24 and the upper path of travel of the forming carrier 22 are fully coordinated.

The core carrying conveyor 26 has its two tandem conveyors 180 and 190 driven by a chain sprocket interconnection with the driven shaft 148′ at one end of the mandrel conveyor 24. Mandrel conveyor shaft 148′ is interconnected to core conveyor shaft 198 by endless sprocket chains 270 and 272. Sprocket chain 270 at one end is connected to a sprocket 274 connected to shaft 148′ and at the other end to a gear transfer shaft 276 by a sprocket 278. Sprocket 278 also affords connection at one end to the endless chain 272 and sprocket 280 connected to shaft 198 affords connection to the other end of the chain 272. The chain 192 of the pawl conveyor 190 trained between sprockets 193 and 196 is driven by the shaft 198. V-shaped conveyor 180 is driven by shaft 188 that is connected to shaft 198 by an endless sprocket chain 282 which is connected at one end to sprocket 280 affixed to shaft 198 and at the other end to sprocket 284 affixed to shaft 188.

A gear transfer case 276′ diagrammatically shown in FIG. 8B includes bevel gears for directing the transmitted drive motion from shaft 276 to the end cap assembly conveyors 28 and 30 by the gear transfer cases 286 and 288 which are interconnected to each other by a shaft 290. Gear transfer case 286 is interconnected to gear transfer case 276′ by the interconnecting shaft 292. It is to be understood, although not shown, that the bevel gear elements of the gear transfer cases 276′, 286 and 288 are arranged relative to the rotation of shaft 148′ so that sprocket shaft 248′ is driven in the same direction.

In order for the lower path of travel of the upper conveyor 30 to be maintained in the same direction as the upper path of travel of the lower conveyor 28 the sprocket shaft 252′ is connected to the shaft 248′ by an interconnecting chain sprocket drive. The chain sprocket drive includes an upper idler sprocket 294 affixed to an idler shaft 296 that is rotatably interconnected to shaft 248′ by the endless sprocket chain 298. The upward and outward incline of the upper path of travel of the sprocket chain 298 is intermeshed with a sprocket 300 affixed to shaft 252′ so as to drive the sprocket 252 of the conveyor 30 and thus the chains 251 and idler sprocket 254 on shaft 254′ in the proper direction. It should now be evident that all the aforedescribed conveyors of the apparatus and systems of the instant invention can be correlated by the common drive system aforedescribed and this system advantageously enables all the carrier of the conveyors 22, 24, 26, 28 and 30 to be fully synchronized.

In order to fully correlate the conveyors of the apparatus 10 at the aforedescribed stations 2 through 5, the drive mechanism can include timing gears. For example, the mandrel and carrier conveyors 22 and 24 can be timely correlated by using sprocket 266 as an adjustable timing gear on the shaft 98′ as illustrated above the centerline in FIG. 9C. The gear or sprocket 266 in this instance provides a hub 304 keyed to the shaft 98′, an outer rim 302 and an annular clamping plate 308. An intermediate annular portion of the hub 304 is sandwiched between the clamping plate 308 and the rim 302. Upon passage of a cap screw 310 through the opening of the rim 302 and into the aligned threaded opening of the plate 308, the plate 308 and rim 302 can be securely attached to the sandwiched portion of the hub 304. The rim 302 can be locked in an angular position about the shaft 98′ relative to the hub 304 upon passage of a locking pin 306 through aligned openings in the rim 302 and the intermediate portion of the hub 304. Thus the rim 302 can be angularly adjusted relative to the hub 304 for timely correlating the conveyors 22 and 24 by the use of the locking pin 306 and cap screws 310. Similarly the other conveyors 26, 28 and 30 can be timely correlated by an adjustable timing gear, if desired.

During continuous operation of the apparatus any jamming or blockage of the movement of the correlated conveyors 22, 24, 26, 28 and 30 would tend to damage the apparatus 10. Consequently, the initial drive gear 264 in FIG. 8B can be mounted on its shaft 262' for relative movement therewith. With further reference to the lower half of FIG. 9C drive gear 264 provides three laterally spaced hub sections 312 and 314 and 326, rim 320 and annular laminations 316 and 318 disposed between the rim 320 and the rims 312 and 314. The rim 320 is clamped between the hub sections 312 and 314 upon passage of cap screws 322 (only one of which is shown) through openings in the hub sections 312 and 314 aligned with the threaded opening 324 within the hub section 326.

The annular laminations 316 and 318 are made of a suitable material which has the feature of frictionally gripping the opposing annular surfaces of the rim 320 and the hub sections 312 and 314. Thus, the rim 320 upon passage of the cap screws 322 through the rims is positively clamped between the hub sections 312 and 314 for transmitting rotation from the shaft 262'. However, when the rim is excessively loaded due to jamming or blocking of the movement of any one of the conveyors 22, 24, 26, 28 and 30, the rim 320 will move or freely wheel relative to the hub sections 312 and 314 until the load is relieved. The rim 320 has a concentric aperture 321 therethrough, the diameter of which is proportioned to permit movement of the rim 320 relative to an intermediate shank portion of the cap screws 322 only one of which is shown passing through the aperture 321. The hub sections 312, 314 and 326 can be keyed in any well-known manner to the shaft 262' for positively transmitting rotation from the shaft 262' to the rim 320 of the gear 264. Thus, the aforedescribed construction of the gear 264 minimizes injury to the apparatus 10 during operation in the event of jamming or blocking the movement of the conveyors 22, 24, 26, 28, and 30.

Turning to FIG. 9 the modified packaging apparatus 10' of the instant invention utilizes the same number of stations as the aforedescribed apparatus 10. In the description of this modified apparatus 10' like reference numerals or prime reference numerals will be used to identify similar parts previously described wherever applicable. The third station, however, is located at the end of the upper path of travel of the extended forming and assemblying conveyor 22'. The attachment of the end caps 20 at the last station is accomplished with only one conveyor 34 which is provided with a modified and improved carrier 340 for grasping and surrounding the sub-assembly 17 of the package P.

The blank 36 is deposited on the carrier 40 of the conveyor 22' at the first station in the same fashion as in the apparatus 10 of FIG. 8. The mandrel conveyor 24 at the second or blank forming station is, as in the case of the previously described apparatus 10, also located above the conveyor 22' and after the first station and the moistening device 126 of FIG. 10.

However, the core carrying conveyor 32 at the third station of the apparatus 10' of the instant invention includes a plurality of V-shaped carriers 330 affixed in equispaced relation to a pair of laterally spaced endless chains 331, only one of which is shown in FIGS. 9, 9B and 14A. The chains 331 at the ends of the conveyor 32 are passed around their respective sprockets 334 and 336 mounted on shafts 334' and 336' carried at the ends of the frame of the conveyor 32. The cores 16 are deposited in any known manner onto the V-shaped carriers 330 at the forward end of the upper path of travel of the conveyor 32 shown in FIG. 9. By virtue of the conveyor 32 being located above the terminal end of the upper path of travel of the conveyor 22', the V-shaped carriers 330 automatically release the core 16 at the third station when the carriers 330 are inverted at the beginning of the lower path of travel of the conveyor 32 as best shown in FIG. 14A. Then under the influence of gravity, the core 16 drops into an opened carrier 40 on conveyor 22' at station 3. To prevent inadvertent release of the cores 16 from the carriers 330 as the carriers 330 are directed around the sprockets 334 by the chains 331, a sheet metal guard 338 of arcuate configuration is affixed in a suitable manner (not shown) to the frame of the conveyor 32. The guard 338 can be disposed relative to the carrier 330 so as not to injure the core 16 and the web 18 wound therearound which are carried by the carrier 330. As will be subsequently described the carriers 330 are driven in timed relation to the carriers 40 on the conveyor 22' whereby each carrier 330 timely transfers the core 16 at the third station into the spread-open housing piece 14 disposed within the associated carrier 40 on the conveyor 22'.

The cam 104' of the conveyor 22' for controlling the opening and closing of the pocket 49 of carrier 40 is slightly modified to compensate not only for the overall inclination of the apparatus 10' as aforementioned in FIG. 9 but also for the relocation of the core conveyor 32 above the forming and assembling conveyor 22. The cam 104' in FIG. 9A at zone A' in the path of travel opens pocket 49 of the carrier 40 for passage through the first station in the same fashion as zone A in the aforedescribed cam 104 of the apparatus 10 of FIG. 8. Zone B has been eliminated in the cam 104' since the open carrier 40 does not converge upwardly toward the lower path of travel of the mandrel 170 at the blank forming station by virtue of the overall inclination of the apparatus 10'. Zones C', D' and E' of cam 104' substantially correspond to zones C, D, and E of cam 104 at the blank forming station where the carrier 40 is closed at zone C' for wrapping the blanket 52 of the carrier 40 around the associated mandrel 170 and the sandwiched blank. At zone D' the sandwiched blank is then formed into the housing piece 14 within the closed carrier and the carrier 40 is then reopened at zone E' for release of the mandrel 170 but retention of the formed housing piece 14. In contrast to the apparatus 10 of FIG. 8, zones F' and H' of the cam 104' are located at the terminal end of the upper flight of the conveyor 22'. At zone F' the minimal spacing between the cam surfaces 106' and 108' maintains the pocket 49 of the carrier 40 in an open position after the end of the blank forming station at the common point between zones E' and F'. Then at the point of mergence between zones F' and H', the core 16 is transferred and inserted into the spread open housing piece 14 as shown in FIG. 14A. No zone G' is required for convergence of the upper path of travel of the carrier 40 with the lower path of travel of the core conveyor 32 at station 3 since the transfer of the core 16 at the third station is simply effected by gravity.

The carrier 40 is reclosed in its passage through zone H' by virtue of the downward and outward direction taken by cam surface 106' in the area indicated at 238' to effect a maximum spacing between the camming surfaces 106' and 108' at the point of mergence between zones H' and I'. The reclosure of the pocket 49 of the carrier 40 with the housing piece 14 surrounding the inserted core 16 is depicted in the last two carriers 40 of FIG. 14A.

The reclosure of the pocket 49 of the carrier 40 is maintained during the upper path of travel of the carrier 40 to the lower path of travel thereof of the conveyor 22'. Thus the carrier 40 is inverted from its upright position to an upside down position and the fingers 82 of the carrier 40 are allowed to automatically pivot downwardly to release the grip of the end portions 83 thereof on the edges of the housing piece 14 defining the slot as described in connection with the previous discussion of apparatus 10 of FIG. 8. As the carrier 40 moves through zone J', it is reopened to transfer the sub-assembly 17 of the package P at the fourth station as shown in FIG. 18A onto the opened carrier 340 on the last conveyor 34 of the apparatus 10'. The carrier 40 after its release of the sub-assembly 17 then re-enters zone A' where the pocket 49 of the carrier 40 is maintained in an open position but moved from the lower path of travel of the conveyor 22' to the upper path of travel thereof for recycling purposes.

The carriers 340 of the conveyor 34 for receiving the sub-assembly 17 of the package P are constructed and arranged in a fashion similar to the carriers 40. Thus, the carrier 340 provides two pairs of arms 342 and 344, a supporting shaft 346, two pairs of block members 348 and a blanket 350 of a flexible yet non-stretchable material similar to the blanket 52 of the carrier 40. Each one of a pair of arms 342 and 344 is pivotally connected to opposite ends of the shaft 346 in the same manner as the aforedescribed arms 54, 54' are connected to the shaft 50 on the carrier 40. As best shown in FIGS. 24 and 25, the lower part of the outer and inner arms 342 and 344 at each end of the support shaft 346 include rotatably mounted wheels 352 and a pair of coil springs 354 extending between and attached to the transverse pins 355 and 357 on the downwardly projecting ears 356 and 358 of the outer and inner arms 342 and 344. The opposing ends of shaft 346 are provided with wheels 360. The wheels 352 and 360 can be mounted by pin-type shafts 359 and washers W in the same manner as wheels 62 and 90 on carrier 40. The inner arm 344 at one end of the shaft 346 and the outer arm 342 at the other end of the shaft 346 are connected to the outer ends of a pair of longitudinally aligned blocks 348 on one side of the carrier 340. The opposing inner ends of the longitudinally aligned blocks 348 are held in spaced relation by a backer plate 347 extending between the outer ends of the blocks 348 as shown in FIG. 24.

The backer plate 347 as best shown in FIG. 25 is disposed between the aligned blocks 348 and one of the inner and outer arms 344 and 342 at each end of the shaft 346.

Appropriate fasteners, such as Allen head screws, generally indicated at 349, can be passed through openings in the upper ends of the arms 342 and 344, the backer plate 347 and into aligned threaded openings in the blocks 348 for fastening together the blocks 348, arms 342 and 344 and the backer plate 347 on one side of the carrier 340. This one side of the carrier 340 also has a stabilizer device 386 affixed to the backer plate 347 intermediate its ends. Fasteners 351 passing through openings in the device 386 at its upper end into aligned threaded openings in the backer plate 347 are used to fasten the device 386 to the backer plate 347. The other side of the carrier 340 as shown in FIGS. 24–25 also includes a pair of longitudinally aligned blocks 348, a backer plate 347 affixed in a similar fashion by the fasteners 349 to the upper ends of the remaining inner arm 344 at the one end of the shaft and the remaining outer arm 342 at the other end of the shaft 346.

The oppositely facing surfaces of the blocks 348 affixed to the arms 342 and 344 as described above provide opposed surfaces 362 of concave configuration below the top edge portions of the blocks 348. This concave surface 362 of each block 348 has a contour approximating one half of the overall contour of the sub-assembly 17 of the package P to be grasped by the carrier 340 when in its closed position in FIG. 25. The blanket 350 is affixed at its opposite edges 364 to the top surfaces of the blocks 348 on each side of the carrier 340. The opposite edges of the blanket 350 in FIGS. 24 and 25 are affixed to the blocks 348 in a known manner by different sized flat plates 366 and 367 and fastener screws 369 associated with each block 348. The blanket 350 is of a width corresponding generally to the length of the aligned blocks 348 on each side of the carrier 340 while the length of the blanket 350 after it is affixed to the blocks 348 generally corresponds to the circumferential length of the housing 14. Thus, when the carrier 340 is closed as in FIGS. 18A or 25, the blanket 350 is wrapped around the outer surface of the housing piece 14 in the same general compressive fashion as previously described in the case of where the housing was grasped by the mated saddle shaped carriers 242 and 246. When the carrier 340 is opened as shown in FIG. 18A, the blanket 350 is in a draped position and defines a pocket 325 for receipt of the sub-assembly 17 from the opened carrier 40 as aforedescribed at the fourth station of the modified apparatus 10' of the instant invention.

The supporting shaft 346 of the carrier 340 is connected intermediate its ends to a pair of laterally spaced endless chains 368. All carriers 340 of the conveyor 34 are affixed to the chains 368 in equispaced relation through a pair of spaced interconnecting angle members 371 as illustrated in FIG. 24. The endless chains 368 are directed around driving sprockets 370 and 372 carried on shafts 370' and 372' supported by the frame of the conveyor 34 at the ends thereof as best shown in FIG. 9B. The chains 368 during their movement along the upper path of travel of the conveyor 34 are supported by rails 374 between the sprockets 370 and 372. These rails are mounted on an intermediate channel shaped portion 376 of the frame of the conveyor 34.

The lateral sidewalls 378 of the frame of the conveyor 34 have channel shaped members 380 affixed thereto on their inside surface and at the upper ends thereof. Members 380 are provided with recesses partially defined by the laterally spaced camming surfaces 382 and 384. The spaced camming surfaces 382 and 384 of each member 384 are respectively engaged by the wheels 352 and 360 at the ends of the carrier 340 during its movement around the endless path of the conveyor. One of the endless cams 380 is shown in FIG. 23A. As the carrier 340 is moved through the zones of the endless path of travel of the cams 380, it is opened and closed in a similar fashion as the aforedescribed carrier 40. Wheels 360 at the ends of the shaft 346 engage the upper cam surfaces 384 while the wheels 352 at the lower ends of the inner and outer arms 344 and 342 at each end of the carrier engage the lower cam surfaces 382. As the parallel spacing between the surfaces 382 and 384 varies from maximum to minimum the pocket 325 of the carrier 340 is opened and conversely when the spacing of surfaces 382 and 394 varies from minimum to maximum the pocket 325 of the carrier 340 is closed. Thus, when the wheels 352 and 360 move through zone V of the cam 380 track, the camming surface 382 as indicated at 385 in FIG. 23A converges toward the camming surface 384 and causes the lower end of the arms 342 and 344 to pivot outwardly relative to each other at each end of the carrier 340 whereby the pocket 325 of the carrier 340 is opened. Then, when the opened carrier moves through zone W, the zone of minimal spacing between the cam surfaces 382 and 384, it remains open. Similarly, when the carrier moves through zone T after leaving zone W the spacing between the cam surfaces 382 and 384 is increased by virtue of the downward inclination of the portion 383 of the surface 382 in zone T. During this inclination of the cam surfaces 382, the lower ends of the biased arms 342 and 344 at each end of the carrier 340 are pivoted towards each other whereby the pocket 325 of the carrier 340 is closed. Then the carrier 340 remains closed throughout its travel through zone U. The carrier then re-enters zone V and it is reopened again as aforedescribed to start another cycle.

The stabilizing device 386 advantageously acts during travel of carrier 340 through zone U of the cam track 380 to assure the proper setting of the inner and outer arms 342 and 344 on the trailing side of the carrier 344 in the direction of the path of travel all as indicated by the arrow in FIG. 25. The stabilizing device 386 includes an arm 388 extending downwardly and outwardly from its aforedescribed connection at the upper end of the arm 388 to the plate 347. A pin 392 passes transversely through an opening in the lower end of the arm 386. The outer ends of the pin 392 mount a pair of wheels 390. The wheels 390 rotatably contact the outer end portions of the upper planar surface 394 of an elongated bar 396. The bar is affixed to the channel shaped member 376 of the frame of the conveyor 34 at an intermediate location between the affixed rails 374 shown in FIG. 24. As will be apparent hereinafter the bar 396 cooperates with the stabilizing arm 388 to assure a predetermined closure of the pocket 375 of the carrier 340 during the assembly of the end caps to the ends of the package sub-assembly 17.

In addition, the bar 396 is provided intermediate its planar surface 394 with a channel shaped recess 398 that is defined by intersecting surfaces that extend inwardly of the planar surface 394. A bar 402 as shown in FIGS. 24–25 of rectangular shape is rigidly affixed between its ends to an intremediate portion of the shaft 346 and extends transversely to the longitudinal axis thereof. The ends of the bar have wheels 400 mounted thereon whereby the axis of the wheels 400 project downwardly and transverse of the bar 402. When the carrier 340 is affixed to the chains 368 on the conveyor 34, the wheels 400 engage the laterally spaced surfaces of the channel shaped recess 398 in the bar 396. By virtue of both wheels 400 engaging the spaced surfaces of the recess 398 the carrier is longitudinally centered relative to the frame of the conveyor 34. The longitudinal centering of the carrier 340 contributes to the attachment of the end caps 20.

As indicated particularly in FIGS. 24 and 24A, the backer plate 347, which mounts the upper end of the stabilizer arm 388 on the trailing side of the carrier, includes outwardly extending end portions 404 that protrude beyond the ends of the carrier 340. The function of these protruding end portions is to engage the bottom-most end caps in the spaced chutes 422 in FIGS. 22 and 23 during passage of the carrier 340 therebetween. Such engagement effects transfer of the bottommost end caps from the lower end of the chutes 422 onto the ends of the carrier 340 for attachment of the caps to their associated ends of the sub-assembly 17 of the package P.

Turning to FIGS. 22 and 23 it will be observed that the upper portion of the frame of the conveyor 34 includes a series of interconnected plates 406, 408, 409 and 410. These plates are mounted on the upper ends of side plates 378. The upper surfaces of plates 406 advantageously mount a pair of spaced strips 412 each of which includes integrally connected portions 414 and 416. Sections 414 are disposed in converging relationship with respect to each other as well as section 416 in the direction of the path of travel of carrier 340 which passes therebetween. Sections 416 are also disposed parallel to one another. Angle-shaped blocks 418 are used to hold the guide strips 412 properly spaced from the ends of the carrier and at the same time in the proper elevated position for them to perform their guiding function. This function involves longitudinally centering the housing 14 of the sub-assembly 17 prior to the pocket 325 of the carrier 340 being pivoted by the cams 380 to its closed position at the end of the zone T shown in FIG. 23A in the path of travel of the carrier. It is to be understood that the guide strips 412 in being mounted by the angle blocks 418 are not only elevated above the top edge of the laterally projecting arms or portions 404 on the carrier 340, but are also elevated in a conventional fashion relative to the ends of the housing 14 so as to engage the uppermost portions of the ends of the housing 14 in order to properly center the housing 14 on the carrier 340 and orient the ends of the housing for reception of the end caps 20 at station 5 located adjacent the exit end of the guide strips.

Although not heretofore mentioned, the bar 396 is only disposed on the upper path of travel of the conveyor 34 and is of a length relatively shorter than the upper path thereof. The bar is of such a length, however, whereby before the carrier 340 passes between the chutes 422 in FIG. 22, the wheels 390 of the stabilizing device 386 and the wheels 400 on the bar 402 will enter the forward end of the bar 396. As is evident upon an inspection of FIG. 22, the forward end of the bar 396 is tapered in a suitable fashion to facilitate proper engagement of the wheels 390 and 400 of the modified carrier 340.

It is to be noted that the aforedescribed chutes 422 in FIGS. 22 and 23 for the modified carrier 340 are affixed to the top surface of plates 408 intermediate their ends and adjacent their inner edges in the same fashion as in the case of the corresponding chutes 422 affixed to plates 425 of conveyor 28 in FIGS. 20 and 21. The lower ends of the angle members 423 of the chutes 422 are cut away, as shown in FIG. 24, for a distance which approximates the greatest overall diameter of an end cap 20. Such cutting away enables the protruding portions 404 of the carrier 340 during its passage between the lower end of the chutes 422 to engage the bottom-most end caps 20 in the chutes 422 and effect transfer onto the carrier 340. As an end cap 20 is dispensed from its chute, the next cap in the chute 422 falls into position to be engaged by the succeeding carrier 340.

Upon initial transfer of the end caps 20 to a carrier 340, they are forced into engagement with the packaged core 16 as the carrier 340 within which the core is disposed passes between the converging cams 428. Each cam 428 includes a pair of slotted plates 429 held in parallel spaced relation by the series of spaced blocks 430. The plates 429 and blocks 430 making up each cam 428 are affixed in a suitable manner to the top surface of the plates 408. As best shown in FIGS. 22 and 24A, the inner edges of the plates 429 on each cam 428 include tapered slots 431' (indicated by dotted lines) which are of maximum depth in the area of chutes 422 and merge with the outer walls of the plates 429 at the other end. The cam walls 431 of slot 431' cooperate to support the flanged end 44 of the transferred caps 20 as they also force boss portion 42 thereof to be progressively wedged into the associated ends of the core 16 of the package within the carrier 340. In other words, the convergent cams 428 during passage of the carrier 340 therebetween forcibly insert the boss portion 42 of the transferred end caps 20 into the associated ends of the core 16 to complete the three-piece package P at the fifth and last station of the apparatus 10' in FIGS. 8 and 22–23. Of course, as the boss portion 42 of the caps 20 is forcibly wedged into the associated ends of the core 16 by the cooperative action of carrier 30 and the cams 428, the recesses 45 at the flanged ends 44 of the caps slip over and encompass the associated ends of the housing piece 14 to close off the ends thereof and the slot 15. During the cap and housing attachment operation, the functions of the bar 396 in engaging the wheels 390 of the stabilizer device 386 and in engaging the wheels 400 of the cross-arm 398 are to keep carrier 340 on course and in a fully closed condition so as to guarantee the proper attachment of end caps 20 with the core 16.

The operations of the several conveyors 22', 24, 32 and 34 of the modified apparatus 10' of the instant invention are synchronized and correlated in the following fashion reference being had to FIG. 9B. In describing the drive arrangement of FIG. 9B like reference numbers will be used for all parts of FIG. 9B corresponding to parts shown in FIG. 8B. The mandrel conveyor 24 is connected to the motor 260 in the same general fashion as in FIG. 8B. The sprocket 98 and its shaft 98' of the conveyor 22', however, are connected to the main drive gear 264 and 266 by the combination of sprockets 436 and 438 on shafts 432 and 98' and an endless chain 434 connected to and extending between the sprockets 436 and 438. Drive gear 266 also drives 268 on shaft 148'. The core conveyor 32 on the other hand is driven by the shaft 148' through the combination of sprockets 442 and 444 respectively mounted on the shafts 148' and 334' and the endless chain 440 connected to and extending between the sprockets 442 and 444. Gear transfer cases 446 and 448 are interconnected to each other by shaft 450 and include gear elements, not shown, for transferring the drive of shaft 432 to the shaft 370' which in turn rotates sprocket 370 so as to drive the endless chains 368 of end cap assembly conveyor 34.

Although either carrier 40 or 40' can be interchangeably incorporated on the conveyor 22 or 22' of the apparatuses 10 or 10' in accordance with the teachings of the instant invention, for the sake of brevity, only the improved carrier 40' will now be described in connection with its use on carrier 22. In such event it is to be understood that when the modified carrier 40' is employed, the modified mandrel 170' described in FIGS. 4 and 7 should be used. As indicated particularly in FIGS. 3–6 and FIGS. 26 and 27, the upper ends of the arms 54 and 54' have been extended by the blocks 444 for the attachment of cam controlled upper and lower fingers 440 and 442 to the trailing and forward sides of the carrier 40'. The lower fingers 440 are connected to the opposite edges of the forming blanket 52 while the upper fingers 442 include lug elements 506 not only for grasping the forward and trailing edges of the blanket 36 when first received on the carrier, but also for grasping the edges of the formed tubular housing piece 14 within the carrier. In addition, the upper arms 442 include stop members 508.

The cam 104 for controlling the movements of arms 440 and 442, as illustrated in FIGS. 6 and 8C, will pass through the same zones of travel A through J as in the case of the apparatus and system of FIG. 8. However, by virtue of the incorporation of the arms 440 and 442 on carrier 40', additional cam elements 482 and 484 are now required in order for the carrier to properly pass in a modified fashion through the zones of travel A to B and G to J. The function of these cams 482 and 484 will now be described.

As the improved carrier 40' moves through the zones A through J, the blanket 52 is opened and closed in a modified fashion from that discussed in connection with carrier 40. For example, in zone A the carrier 40' would be in a partially opened position which corresponds to the open position of the carrier 40 as best shown in FIG. 10. However, it has been found that if the blanket 52 is further opened to a fully taut and flat position as shown in FIG. 26 the deposited blank 36 can be more readily centered relative to the forming blanket 52 of the carrier. Consequently, as the partially open pocket 49' of the carrier 40' enters the forward end of the upper path of travel of the conveyor 22 the cams 482 and 484 pivot both upper and lower fingers 442 and 444 upwardly to fully open the pocket of the carrier so that the blanket 52 is in an appropriate taut position. After deposit of the flat blank 36 on carrier 40', at the first station in FIG. 26, the cam 484 in zone A of FIG. 8C which includes a downwardly inclined portion indicated at 510 acts to close the upper fingers 442 and bring them into contact with the edges of the blank 36. At the same time, the stops 508 on the upper fingers 442 of the carrier are acting during receipt of the blank 36 at the first station to retain the deposited blank 36 on the carrier 40'.

As the carrier 40' approaches station 2 of FIG. 26, it first moves through zone B, where the path of travel of the carrier 40' converges with the path of travel of mandrel 170'. As is evident from an inspection of FIG. 8C, the carrier 40', at it exists from zone B, also moves away from cams 482 and 484 so that the upper and lower fingers 440 and 42 are pivoted to their closed position. However, the pocket 49' of the carrier is still kept partially open and does not fully close until the carrier 40' moves through zone C, where the upper ends of the arms 54 and 54' are pivoted towards each other. At this time while the carrier 40' passes through zone D, the blank assumes the form of a tubular housing. Next, as carrier 40' traverses zone E, the arms 54 and 54' are pivoted to partially open the carrier so that the mandrel 170' can be released at the point of merger of zones E and F.

During the passage through zone E, the upper and lower fingers 440 and 442 advantageously remain in their closed position so that the lugs 506 can still engage the edges of the formed housing piece defining the slot 15 and maintain the formed housing 14 in a spread-open condition against the blanket 52 such as shown in FIG. 26. In passing through zone F of cam 104 of FIG. 8C, the carrier is maintained in its partially opened condition and inverted from an upright position to an upside down position prior to the third station for insertion and transfer of the core.

In passing through zone G, the path of travel of the partially reopened pocket 49' of the carrier converges toward the path of travel of the pawl conveyor 190. Upon passage of carrier 40' through zone H and at station 3, the pocket 49' of the carrier 40' is closed around the transferred and inserted core 16, while the upper fingers 442 are pivoted upwardly by means of their cam 484 to effect release of the lugs 506 from engagement with the longitudinal edges of the housing piece 14. This upward pivoting of the fingers 442 in zone H assures that the arms 442 do not interfere with the outward pivoting of the pawls 202 in releasing themselves from engagement with the associated ends of the transferred and inserted core 16.

The carrier 40' then travels through zone I with its pocket 49' in a partially opened condition by the action of the camming surfaces 502 and 504 of the cams 482 and 484. Upon passage of the carrier 40' through zone J, the carrier pocket is fully opened and the sub-assembly 17 is released at the fourth station. As carrier 40' leaves zone J, it re-enters zone A where it goes through a recycle.

Advantageous embodiments of the invention have been shown and described. It should be obvious to those skilled in the art that various changes and modifications may be made therein without departing from the spirit and scope thereof as set forth in the appended claims, wherein:

What is claimed is:

1. In a system for forming a housing for a package or the like comprising a series of stations, a carrier provided with pocket means movable between a pair of stations, means for moving said carrier to and past the said stations, means for depositing a formable blank on said carrier at a first station, control means associated with the carrier for maintaining said carrier pocket means in an open condition during the reception of said blank by said pocket means at the first station and during the transfer of said blank from said first station and during the transfer of said blank from said first station to a second station, mandrel means insertable within said carrier pocket means at said second station for engaging said deposited blank and for forcing said blank into said pocket means, said pocket control means including means separate from said mandrel means for closing said pocket means about said blank during the insertion of the said blank within said carrier pocket means so as to make said blank assume the predetermined configuration of the pocket means, means for controlling said mandrel means whereby said mandrel means operates in conjunction with said pocket control means for retaining said mandrel means along with said blank in said pocket means during the time said carrier is passing through said second station and means operable in conjunction with said carrier pocket control means and said means controlling said mandrel means for withdrawing said mandrel means completely from the pocket means as well as the formed blank as the carrier exits from the second station.

2. In a system for forming a housing for a package or the like comprising a series of stations, a carrier provided with pocket means movable between a pair of stations, means for moving said carrier to and past the said stations, means for depositing a formable blank on said carrier at a first station, control means associated with the carrier for maintaining said carrier pocket means in an open condition during the reception of said blank by said pocket means at the first station and during the transfer of said blank from said first station to a second station, mandrel means insertable within said carrier pocket means at said second station for engaging said deposited blank and for forcing said blank into said pocket means and for making said blank assume the predetermined configuration of the pocket means, means for controlling said mandrel means whereby said mandrel means operates in conjunction with said pocket control means for retaining said mandrel means along with said blank in said pocket means during the time said carrier is passing through said second station, means operable in conjunction with said carrier pocket control means and said means controlling said mandrel means for withdrawing said mandrel means completely from the pocket means as well as the formed blank as the carrier exits from the second station, an endless conveyor upon which the carrier is mounted and means disposed adjacent the conveyor and in the path of travel of the carrier for effecting operation of the carrier pocket control means.

3. A system as set forth in claim 1 including means for heating the mandrel means.

4. In a system for forming a housing for a package or the like comprising a series of stations, a carrier provided with pocket means movable between a pair of stations, means for moving said carrier to and past the said stations, means for depositing a formable blank on said carrier at a first station control means associated with the carrier for maintaining said carrier pocket means in an open condition during the reception of said blank by said pocket means at the first station and during the transfer of said blank from said first station to a second station, mandrel means insertable within said carrier pocket means at said second station for engaging said deposited blank and for forcing said blank into said pocket means and for making said blank assume the predetermined configuration of the pocket means, means for controlling said mandrel means whereby said mandrel means operates in conjunction with said pocket control means for retaining said mandrel means along with said blank in said pocket means during the time said carrier is passing through said second station, means operable in conjunction with said carrier pocket control means and said means controlling said mandrel means for withdrawing said mandrel means completely from the pocket means as well as the formed blank as the carrier exits from the second station and said pocket means including a blanket of flexible and nonstretchable material for enshrouding said blank upon the insertion of said blank in said pocket means.

5. A system as set forth in claim 1 wherein said carrier is provided with movable fingers for engaging certain edge portions of the blank so as to retain the blank on the carrier prior to insertion of the mandrel means in and withdrawal of the mandrel means from said pocket means and said blank.

6. In a system for forming a housing for a package or the like comprising a series of stations, a carrier provided with pocket means movable between a pair of stations, means for moving said carrier to and past the said stations, means for depositing a formable blank on said carrier at a first station, control means associated with the carrier for maintaining said carrier pocket means in an open condition during the reception of said blank by said pocket means at the first station and during the transfer of said blank from said first station to a second station, mandrel means insertable within said carrier pocket means at said second station for engaging said deposited blank and for forcing said blank into said pocket means and for making said blank assume the predetermined configuration of the pocket means, means for controlling said mandrel means whereby said mandrel means operates in conjunction with said pocket control means for retaining said mandrel means along with said blank in said pocket means during the time said carrier is passing through said second station, means operable in conjunction with said carrier pocket control means and said means controlling said mandrel means for withdrawing said mandrel means completely from the pocket means as well as the formed blank as the carrier exits from the second station, said carrier also being provided with movable fingers for engaging certain edge portions of the blank so as to retain the blank on the carrier prior to insertion of the mandrel means in and withdrawal of the mandrel means from said pocket means and said blank, said fingers being mounted on scissors-like arms and means for pivoting said scissors-like arms so as to move said fingers and to open and close said pocket means.

7. A system as set forth in claim 6 including cam means for pivoting said scissors-like arms.

8. A system as set forth in claim 6 including cam means for pivoting said fingers to an open position.

9. In a system for forming a housing for a package or the like comprising a series of stations, a carrier provided with pocket means movable between a pair of stations, means for moving said carrier to and past the said stations, means for depositing a formable blank on said carrier at a first station, control means associated with the carrier for maintaining said carrier pocket means in an open condition during the reception of said blank by said pocket means at the first station and during the transfer of said blank from said first station to a second station, mandrel means insertable within said carrier pocket means at said second station for engaging said deposited blank and for forcing said blank into said pocket means and for making said blank assume the predetermined configuration of the pocket means, means for controlling said mandrel means whereby said mandrel means operates in conjunction with said pocket control means for retaining said mandrel means along with said blank in said pocket means during the time said carrier is passing through said second station, means operable in conjunction with said carrier pocket control means and said means controlling said mandrel means for withdrawing said mandrel means completely from the pocket means as well as the formed blank as the carrier exits from the second station and means disposed between the first and second stations for pretreating the blank prior to the forming thereof at the second station.

10. In a system as set forth in claim 1 including stop elements on said carrier for centering the blank.

11. In a system for forming a multipart package the combination of a series of stations, a conveyor movable past all of said stations, said conveyor having a carrier provided with pocket means, means for continuously moving said conveyor along with said carrier successively through all of said stations, means for depositing a formable blank on said carrier at a first station, means for controlling and maintaining said carrier pocket means in an open condition during the reception of said blank by said pocket means at the first station and during the transfer of said blank from said first to a second station, mandrel means operable in conjunction with said carrier pocket control means and insertable within said carrier pocket means at said second station for engaging said deposited blank and for forcing said blank into said pocket means and for making said blank assume the predetermined configuration of the pocket means, means for closing the carrier pocket means and for retaining said mandrel means along with said blank in said pocket means during the time said carrier is passing through said second station, means operable in conjunction with said carrier pocket control means for reopening said carrier pocket means and for withdrawing said mandrel means completely from the pocket means as well as the formed blank as the carrier exits from the second station, means located at a third station for disposing a product within the formed blank in the reopened pocket means as the carrier passes through said third station, means operable at the third station for reclosing said carrier pocket means about the blank and the product, a second movable carrier located at a fourth station, means for operating said first carrier pocket control means so as to reopen that first carrier pocket means and effect a discharge of the blank along with the product onto said second movable carrier at said fourth station, means for moving said second carrier along with said blank and the product contained therein through a fifth station, means at said fifth station for orienting the blank and the product contained therein and for delivering package closure elements, and a further means at the fifth station for applying the delivered package closure elements to the blank to complete the multipart package assembly.

12. A system as set forth in claim 11, wherein said second carrier also includes a pocket means and a control means connected to said second mentioned pocket means, and operable during movement of said second carrier for opening said second pocket means to receive the subassembly at the fourth station and for closing said last mentioned pocket means to grasp and orient the subassembly at the fifth station.

13. A system as set forth in claim 11 wherein said closure elements applying means include cooperative means on said second carrier and at the fifth station for effecting transfer of the closure elements onto said second carrier and for effecting application of the closure elements to the grasped subassembly.

14. A system as set forth in claim 11 wherein said blank orienting means includes guide means for centering the blank relative to said second carrier and for centering the second carrier relative to a closure element dispensing means.

15. A system as set forth in claim 11 wherein said orienting means includes a third conveyor superposed over said second conveyor at the fifth station, said third conveyor including a carrier alignable with the second carrier for enshrouding and grasping the blank.

16. In a system as set forth in claim 15 wherein said closure element applying means includes cooperative means on said second conveyor and said second carrier for effecting transfer and application of the closure elements to the grasped subassembly.

17. In a system for forming a multipart package the combination of a series of stations, a conveyor, said conveyor having a carrier provided with pocket means, means for continuously moving said conveyor along with said carrier successively through all of said stations, means for depositing a formable blank on said carrier at a first station, control means for maintaining said carrier pocket means in an open condition during the reception of said blank by said pocket means at the first station and during the transfer of said blank from said first to a second station, mandrel means operable in conjunction with said carrier pocket control means and insertable within said carrier pocket means at said second station for engaging said deposited blank and for forcing said blank into said pocket means and for making said blank assume the predetermined configuration of the pocket means, means for closing the carrier pocket means and for retaining said mandrel means along with said blank in said pocket means during the time said carrier is passing through said second station, means operable in conjunction with said carrier pocket control means for reopening said carrier pocket means and for withdrawing said mandrel means completely from the pocket means as well as the formed blank as the carrier exists from the second station and means located at a third station for disposing a product within the formed blank in the reopened pocket means at the carrier passes through said third station.

18. A system as set forth in claim 17 wherein said product disposing means includes at least one conveyor means for initially receiving the product and for carrying the product to the third station.

19. A system as set forth in claim 17 wherein said product disposing means includes at least one conveyor means having pivotal pawls engageable with said product.

20. A system as set forth in claim 19 including cam means for pivoting said pawls for engaging the product and for disengaging them from the product at the third station after disposition of the product into the formed blank.

21. A system as set forth in claim 17 wherein said product disposing means includes a conveyor overlying said carrier at the third station.

22. A system as set forth in claim 17 wherein said product disposing means comprises a conveyor underlying said carrier at the third station.

23. In a system for forming a multipart package the combination of a series of stations, a conveyor, said conveyor having a carrier provided with pocket means, means for continuously moving said conveyor along with said carrier successively through all of said stations, means for depositing a formable blank on said carrier at a first station, control means for maintaining said carrier pocket means in an open condition during the reception of said blank by said pocket means at the first station and during the transfer of said blank from said first to a second station, mandrel means operable in conjunction with said carrier pocket control means and insertable within said carrier pocket means at said second station for engaging said deposited blank and for forcing said blank into said pocket means and for making said blank assume the predetermined configuration of the pocket means, means for closing the carrier pocket means and for retaining said mandrel means along with said blank in said pocket means during the time said carrier is passing through said second station, means operable in conjunction with said carrier pocket control means for reopening said carrier pocket means and for withdrawing said mandrel means completely from the pocket means as well as the formed blank as the carrier exits from the second station, means located at a third station for disposing a product within the formed blank in the reopened pocket means as the carrier passes through said third station, means operable at the third station for reclosing said carrier pocket mean about the blank and the product located therein and a further means for applying package closure elements to the blank to complete the multipart package assembly.

24. In a system for forming a multipart package the combination of a series of stations, a conveyor, said conveyor having a carrier provided with pocket means, means for continuously moving said conveyor along with said carrier successively through all of said stations, means for depositing a formable blank on said carrier at a first station, control means for maintaining said carrier pocket means in an open condition during the reception of said blank by said pocket means at the first station and during the transfer of said blank from said first to a second station, mandrel means operable in conjunction with said carrier pocket control means and insertable within said carrier pocket means at said second station for engaging said deposited blank and for forcing said blank into said pocket means and for making said blank assume the predetermined configuration of the pocket means, means for closing the carrier pocket means and for retaining said mandrel means along with said blank in said pocket means during the time said carrier is passing through said second station, means operable in conjunction with said carrier pocket control means for reopening said carrier pocket means and for withdrawing said mandrel means completely from the pocket means as well as the formed blank as the carrier exits from the second station, means located at a third station for disposing a product within the formed blank in the reopened pocket means as the carrier passes through said third station, means operable at the third station for reclosing said carrier pocket means about the blank.

25. In a system for forming a multipart package the combination of a series of stations, a conveyor, said conveyor having a carrier provided with pocket means, means for continuously moving said conveyor along with said carrier successively through all of said stations, means for depositing a formable blank on said carrier at a first station, control means for maintaining said carrier pocket means in an open condition during the reception of said blank by said pocket means at the first station and during the transfer of said blank from said first to a second station, mandrel means operable in conjunction with said carrier pocket control means and insertable within and disengageable from said carrier pocket means at said second station for engaging said deposited blank and for forcing said blank into said pocket means and for making said blank assume the predetermined configuration of the pocket means and means for operating said mandrel means in conjunction and synchronization with said carrier pocket control means so that the mandrel means can become disengageable from said carrier pocket means at the exit end of said second station while the blank of predetermined configuration is retained therein.

26. In a system for forming a multipart package the combination of a series of stations, a conveyor, said conveyor having a carrier provided with pocket means, means for continuously moving said conveyor along with said carrier successively through all of said stations, means for depositing a formable blank on said carrier at a first station, control means for maintaining said carrier pocket means in an open condition during the reception of said blank by said pocket means at the first station and during the transfer of said blank from said first to a second station, mandrel means operable in conjunction with said carrier pocket control means and insertable within and disengageable from said carrier pocket means at said second station for engaging said deposited blank and for forcing said blank into said pocket means and for making said blank assume the predetermined configuration of the pocket, means for closing the pocket means at the second station, means for reopening the pocket means as the carrier exits from the second station, means located at a third station for disposing a product within the formed blank in the reopened pocket means as the carrier passes through said third station, means operable at the third station for reclosing said carrier pocket means about the blank and the product, a second movable carrier located after the third station, means for operating said first carrier pocket control means so as to reopen that first carrier pocket means and effect a discharge of the blank along with the product onto said second movable carrier after the third station and a further means at another station for applying package closure elements to the blank to complete the multipart package assembly.

27. In a system for forming a multipart package the combination of a series of stations, a carrier provided with pocket means for receiving a package blank and movable between at least a pair of stations, means for moving said carrier to and past the said pair of stations, means mounted on said pocket means for engaging the edges of the blank, said blank edge engaging means being operable to open and close said blank for receiving and discharging a forming mandrel means at one station in said series of stations.

28. A system as set forth in claim 27 including cam means for operating said blank edge engaging means.

29. A system as set forth in claim 27 including a forming mandrel means insertable in said carrier at the second station of said pair of stations, said forming mandrel means including recesses alignable with said blank edge engaging means so as to enable ample clearance between said forming mandrel means and said blank edge engaging means.

30. A system as set forth in claim 27 wherein said blank edge engaging means includes pivotal fingers for positively engaging the centered blank between certain of said stations.

31. A system as set forth in claim 27 wherein said blank edge engaging means are disposed in underlying engagement with the deposited blank.

32. In a system for forming a multipart package the combination of a series of stations, a conveyor, said conveyor having a carrier provided with pocket means and control means for said pocket means, means for continuously moving said conveyor along with said carrier successively through all of said stations, means for depositing a formable blank on said carrier at a first station, means operable in conjunction with said carrier pocket control means for forming the blank at a second station, means located at a third station for disposing a product within the formed blank as the carrier passes through said third station, elements operable between the second and third stations for engaging the edges of the blank and keeping said edges spaced apart so as to receive the product at the third station.

33. A system as claimed in claim 32 including means for releasing said blank edge engaging elements from the blank whereby the blank edges can return to a position of rest and the blank will be allowed to enclose the product.

34. A system as claimed in claim 32 wherein the said blank edge engaging elements are automatically released under the influence of gravity from said blank upon their passage through the third station.

35. A system as claimed in claim 32 wherein said blank edge engaging elements include control means for effecting release of the blank edge engaging elements from the blank upon their passage through the third station.

36. A system as claimed in claim 32 including a forming blanket of flexible material associated with said carrier pocket means.

37. A system as set forth in claim 36 wherein said forming blanket cooperates with said blank edge engaging elements between the second and third stations for keeping the edges of the blank spaced apart.

38. In a system for forming a multipart package the combination of a series of stations, a conveyor, said conveyor having a carrier provided with pocket means, means for continuously moving said conveyor along with said carrier successively through all of said stations, means including a retractable mandrel for depositing a formable blank on said carrier at a first station and control means for maintaining said carrier pocket means in an open condition during the reception of said blank by said pocket means at the first station and said carrier including a flexible and nonstretchable forming blanket for receiving and supporting the blank.

39. A system as set forth in claim 38 wherein the carrier includes blank edge engaging means which cooperate with said blanket to hold the blank on the carrier as it passes between certain of said stations.

References Cited

UNITED STATES PATENTS 1,108,027   8/1914   Thorschmidt _____ 53—116
2,967,328   1/1961   Shelby et al. _____ 53—184

THERON E. CONDON, Primary Examiner
E. F. DESMOND, Assistant Examiner

U.S. Cl. X.R.
53—284; 93—81

UNITED STATES PATENT OFFICE
CERTIFICATE OF CORRECTION

Patent No. 3,466,845   Dated September 16, 1969

Inventor(s) Hugh A. Beekes, Thomas R. Herrmann, Melbourne A. Lip Henning H. Olson, and Allen K. Schleicher It is certified that error appears in the above-identified patent and that said Letters Patent are hereby corrected as shown below:

```
Column  1, line 25,  "merchanise" should be -- merchandise --;
Column  1, line 26,  "if desired" should be -- if desired, --;
Column  2, line 33,  "packaging" should be -- package --;
Column  2, line 63,  "forming assembling" should be -- forming
                      and assembling --;
Column  3, line  2,  "conveyor." should be -- conveyor; --;
Column  3, line 22,  "carried" should be -- carrier --;
Column  4, line 72,  "22, and" should be -- 22 and --;
Column  8, line 21,  "engege-" should be -- engage- --;

Column 14, line 54,  "maintains" should be -- maintain --;
Column 15, line 69,  "suported" should be -- supported --;
Column 16, line 25,  "permits" should be -- permit --;
Column 19, line  2,  "carrier" should be -- carriers --;
Column 20, line 57,  "carrier" should be -- carriers --;
Column 24, line 46,  "394" should be -- 384 --;
Column 25, line 18,  "intremediate" should be -- intermediate --;
Column 28, lines 49 and 50, "fer of said blank from said first
                      station and during the transfer of said blai
                      from said first station to a second" should
                      be -- fer of said blank from said first
                      station to a second --;
Column 29, line 29,  "station" should be -- station, --;
Column 31, line 70,  "at" should be -- as --; and
Column 32, line 43,  "mean" should be -- means --.
```

SIGNED AND
SEALED
SEP 15 1970

(SEAL)
Attest:

Edward M. Fletcher, Jr.
Attesting Officer

WILLIAM E. SCHUYLER, JR
Commissioner of Patents